(12) United States Patent
Claesson et al.

(10) Patent No.: US 8,071,922 B2
(45) Date of Patent: Dec. 6, 2011

(54) IMPINGEMENT/CONVECTION/MICROWAVE OVEN AND METHOD

(75) Inventors: Jan Claesson, Port Richey, FL (US); Keith A. Stanger, Trinity, FL (US); Nigel Thorneywork, Surry (GB); Andrew Brown, Hants (GB); Davic Crayfourd, Hants (GB); David Harter, New Port Richie, FL (US); William Day, New Port Richey, FL (US)

(73) Assignee: Enodis Corporation, New Port Richey, FL (US)

( * ) Notice: Subject to any disclaimer, the term of this patent is extended or adjusted under 35 U.S.C. 154(b) by 0 days.

(21) Appl. No.: 11/302,638

(22) Filed: Dec. 14, 2005

(65) Prior Publication Data

US 2006/0157479 A1 Jul. 20, 2006

Related U.S. Application Data

(60) Provisional application No. 60/635,857, filed on Dec. 14, 2004, provisional application No. 60/682,594, filed on May 19, 2005, provisional application No. 60/735,241, filed on Nov. 9, 2005.

(51) Int. Cl.
*H05B 6/80* (2006.01)
*H05B 6/64* (2006.01)

(52) U.S. Cl. ........ 219/681; 219/757; 219/400; 219/685; 126/21 A

(58) Field of Classification Search .......... 219/681, 219/757, 724, 705, 506, 492, 722, 683, 400, 219/720, 682, 685, 401; 714/46; 126/21 A
See application file for complete search history.

(56) References Cited

U.S. PATENT DOCUMENTS

| 750,276 | A | 1/1904 | Gruss |
| 1,986,088 | A | 11/1932 | Wild .................................. 219/35 |
| 2,098,295 | A | 3/1933 | Kettering et al. ............. 128/373 |
| 2,106,462 | A | 10/1935 | Lindberg ......................... 219/35 |

(Continued)

FOREIGN PATENT DOCUMENTS

| CN | 1356501 A | 7/2002 |
| DE | 4139904 | 6/1993 |
| EP | 0437344 | 7/1991 |
| EP | 0592255 A | 4/1994 |
| FR | 2705766 | 12/1994 |

(Continued)

OTHER PUBLICATIONS

International Search Report dated Feb. 22, 2008 concerning Application PCT/US2005/045049.

(Continued)

*Primary Examiner* — Quang Van
(74) *Attorney, Agent, or Firm* — Ohlandt, Greeley, Ruggiero & Perle, L.L.P.

(57) ABSTRACT

A combination oven that is operable with convection air, impingement air and microwave energy in various combinations thereof. The oven has an oven chamber and a fan box that are located front to back. A fan in the fan box circulates heated air by discharging via openings in a top and a bottom and taking in via an intermediate opening of a baffle plate. Impingement plates are easily installed and removed in the oven chamber to provide impingement air upwardly or downwardly. At least one of the impingement plates is installed and removed by a sliding motion. Microwave energy is provided through the side walls of the oven chamber. Intake ports for cooling air are located in a bevel between the side walls and bottom wall of the oven's outer enclosure so as to allow the oven to be located right next to other structures, such as a wall. An interlock assembly is also provided for the oven door.

16 Claims, 18 Drawing Sheets

U.S. PATENT DOCUMENTS

| | | | | |
|---|---|---|---|---|
| 2,214,630 A | 3/1939 | Wheeler | | 219/35 |
| 2,458,190 A | 12/1947 | Newburger | | 219/19 |
| 2,791,199 A | 5/1957 | Hamnett | | 119/35 |
| 3,221,729 A | 12/1965 | Beasley et al. | | 126/21 |
| 3,235,971 A | 2/1966 | Tooby | | 34/1 |
| 3,304,406 A | 2/1967 | King | | 219/411 |
| 3,364,912 A | 1/1968 | Dills et al. | | 126/21 |
| 3,384,068 A | 5/1968 | Perry et al. | | 126/21 |
| 3,470,942 A | 10/1969 | Fukada et al. | | 165/2 |
| 3,518,949 A | 7/1970 | Stock | | 107/7 |
| 3,538,904 A | 11/1970 | Baker | | 126/21 |
| 3,545,832 A | 12/1970 | Levenback | | 312/114 |
| 3,692,968 A | 9/1972 | Yasuoka | | 219/10.55 |
| 3,780,794 A | 12/1973 | Staub | | 165/58 |
| 3,784,776 A | 1/1974 | Asanuma | | |
| 3,785,778 A | 1/1974 | Burstein et al. | | 23/288 |
| 3,828,760 A | 8/1974 | Farber et al. | | 126/21 |
| 3,884,213 A | 5/1975 | Smith | | 126/21 |
| 3,905,760 A | 9/1975 | Johansson et al. | | 432/176 |
| 3,991,737 A | 11/1976 | Del Fabbro | | 126/21 A |
| 4,029,463 A | 6/1977 | Johansson et al. | | 432/25 |
| 4,059,399 A | 11/1977 | Cellier et al. | | 432/121 |
| 4,096,369 A | 6/1978 | Tanaka et al. | | 219/10.55 D |
| 4,097,709 A | 6/1978 | Bächtold et al. | | 219/10.55 R |
| 4,109,636 A | 8/1978 | Burge | | 126/21 A |
| 4,113,439 A | 9/1978 | Ookubo et al. | | 422/177 |
| 4,116,620 A | 9/1978 | Stibbe | | 432/59 |
| 4,154,861 A | 5/1979 | Smith | | 426/466 |
| 4,162,141 A | 7/1979 | West | | 432/144 |
| 4,233,495 A | 11/1980 | Scoville et al. | | 219/386 |
| 4,275,464 A | 6/1981 | Schmidt | | |
| 4,283,614 A | 8/1981 | Tanaka et al. | | 219/10.55 R |
| 4,289,792 A | 9/1981 | Smith | | 426/241 |
| 4,327,274 A | 4/1982 | White et al. | | 219/10.55 R |
| 4,332,992 A | 6/1982 | Larsen et al. | | 219/10.55 R |
| 4,337,384 A | 6/1982 | Tanaka et al. | | 219/10.55 R |
| 4,338,911 A | 7/1982 | Smith | | 126/21 |
| 4,363,957 A | 12/1982 | Tachikawa et al. | | 219/497 |
| 4,373,504 A | 2/1983 | Day | | 126/21 |
| 4,381,442 A | 4/1983 | Guibert | | 219/400 |
| 4,409,453 A | 10/1983 | Smith | | 219/10.55 A |
| 4,415,799 A | 11/1983 | Tanaka et al. | | 219/400 |
| 4,430,541 A | 2/1984 | Day, Jr. | | 219/10.55 R |
| 4,455,478 A | 6/1984 | Guibert | | 219/400 |
| 4,471,750 A | 9/1984 | Burtea | | 126/21 A |
| 4,479,776 A | 10/1984 | Smith | | 432/144 |
| 4,480,164 A | 10/1984 | Dills | | 219/10.55 R |
| 4,481,396 A | 11/1984 | Matsubayashi et al. | | 219/10.55 B |
| 4,492,839 A | 1/1985 | Smith | | 219/10.55 R |
| 4,523,391 A | 6/1985 | Smith et al. | | 34/225 |
| 4,556,043 A | 12/1985 | Bratton | | 126/21 A |
| 4,576,090 A | 3/1986 | Burtea | | 99/443 |
| 4,627,409 A | 12/1986 | Kagomoto | | 126/21 |
| 4,654,508 A | 3/1987 | Logel et al. | | 219/400 |
| 4,679,542 A | 7/1987 | Smith et al. | | 126/21 |
| 4,750,276 A | 6/1988 | Smith et al. | | 34/149 |
| 4,780,254 A | 10/1988 | Ando | | 261/81 |
| 4,780,596 A | 10/1988 | Matsushima et al. | | 219/400 |
| 4,829,158 A * | 5/1989 | Burnham | | 219/400 |
| 4,870,254 A | 9/1989 | Arabori et al. | | 219/400 |
| 4,913,223 A | 4/1990 | Mizuno et al. | | 165/61 |
| 4,914,277 A | 4/1990 | Guerin | | |
| 4,935,604 A | 6/1990 | Allen et al. | | 219/400 |
| 4,954,693 A | 9/1990 | Mitsuhashi et al. | | 219/400 |
| 4,960,100 A | 10/1990 | Pellicane | | 126/21 |
| 5,050,578 A | 9/1991 | Luebke et al. | | 126/21 A |
| 5,094,222 A | 3/1992 | Fukuda et al. | | 126/19 R |
| 5,107,097 A | 4/1992 | Negandhi et al. | | 219/400 |
| 5,142,125 A | 8/1992 | Fioroli et al. | | 219/400 |
| 5,154,940 A | 10/1992 | Budzyna et al. | | 426/232 |
| 5,155,318 A | 10/1992 | Bowen | | 219/10.55 D |
| 5,166,487 A | 11/1992 | Hurley et al. | | 219/10.55 R |
| 5,180,898 A | 1/1993 | Alden et al. | | 219/388 |
| 5,204,503 A | 4/1993 | Maiellano, Jr. | | 219/10.55 B |
| 5,205,274 A | 4/1993 | Smith et al. | | 126/21 |
| 5,254,823 A | 10/1993 | McKee et al. | | 219/10.55 |
| 5,308,956 A | 5/1994 | Halters et al. | | 219/400 |
| 5,310,978 A | 5/1994 | Smith et al. | | 219/681 |
| 5,345,923 A | 9/1994 | Luebke et al. | | 126/21 A |
| 5,388,177 A | 2/1995 | Ono et al. | | 392/386 |
| 5,401,940 A | 3/1995 | Smith et al. | | 219/679 |
| 5,423,248 A | 6/1995 | Smith et al. | | 99/443 |
| 5,431,887 A | 7/1995 | Bar-Ilan | | 422/177 |
| 5,434,390 A | 7/1995 | McKee et al. | | 219/681 |
| 5,483,044 A | 1/1996 | Thorneywork et al. | | 219/681 |
| 5,510,601 A | 4/1996 | Smith et al. | | 219/679 |
| 5,558,793 A | 9/1996 | McKee et al. | | 219/391 |
| 5,568,802 A | 10/1996 | Buday et al. | | 126/21 |
| 5,580,535 A | 12/1996 | Hoke et al. | | 423/245.3 |
| 5,582,758 A | 12/1996 | Smith et al. | | 219/681 |
| 5,616,270 A | 4/1997 | Park | | |
| 5,620,731 A | 4/1997 | McKee | | 426/505 |
| 5,676,044 A * | 10/1997 | Lara, Jr. | | 99/331 |
| 5,717,192 A | 2/1998 | Dobie et al. | | 219/681 |
| 5,747,775 A | 5/1998 | Tsukamoto et al. | | 219/400 |
| 5,756,053 A | 5/1998 | Hoke et al. | | 422/174 |
| 5,756,974 A * | 5/1998 | Hong | | 219/681 |
| 5,927,265 A | 7/1999 | McKee et al. | | 126/21 A |
| 5,928,541 A | 7/1999 | Tsukamoto et al. | | 219/400 |
| 5,954,986 A | 9/1999 | Tsukamoto et al. | | 219/754 |
| 5,958,274 A | 9/1999 | Dobie et al. | | 219/681 |
| 5,990,466 A | 11/1999 | McKee et al. | | 219/746 |
| 6,008,483 A | 12/1999 | McKee et al. | | 219/746 |
| 6,058,924 A | 5/2000 | Pool, III et al. | | 126/21 A |
| 6,060,701 A | 5/2000 | McKee et al. | | 219/681 |
| 6,066,837 A | 5/2000 | McCormick et al. | | 219/702 |
| RE36,724 E | 6/2000 | Westerberg et al. | | 219/685 |
| 6,140,626 A | 10/2000 | McKee et al. | | 219/681 |
| 6,146,678 A | 11/2000 | Caridis et al. | | 426/510 |
| 6,218,650 B1 | 4/2001 | Tsukamoto et al. | | 219/681 |
| 6,250,296 B1 | 6/2001 | Norris et al. | | 126/21 |
| 6,262,406 B1 | 7/2001 | McKee et al. | | 219/681 |
| 6,291,808 B1 | 9/2001 | Brown | | 219/681 |
| 6,320,165 B1 | 11/2001 | Ovadia | | 219/400 |
| 6,359,271 B1 | 3/2002 | Gidner et al. | | 219/732 |
| 6,376,817 B1 * | 4/2002 | McFadden et al. | | 219/681 |
| 6,392,211 B2 | 5/2002 | Kim et al. | | 219/681 |
| 6,399,930 B2 | 6/2002 | Day et al. | | 219/681 |
| 6,440,746 B1 | 8/2002 | Troxler | | |
| 6,462,319 B1 | 10/2002 | Uy et al. | | 219/681 |
| 6,472,640 B2 | 10/2002 | Brown et al. | | 219/400 |
| 6,472,647 B2 * | 10/2002 | Lee et al. | | 219/681 |
| 6,528,773 B2 | 3/2003 | Kim et al. | | 219/681 |
| 6,541,745 B2 | 4/2003 | Kim et al. | | 219/681 |
| 6,541,746 B2 | 4/2003 | Kim et al. | | 219/681 |
| 6,566,638 B2 | 5/2003 | Brown | | 219/681 |
| 6,603,102 B2 | 8/2003 | Brown et al. | | 219/681 |
| 6,730,881 B1 | 5/2004 | Arntz et al. | | 219/400 |
| 6,874,495 B2 | 4/2005 | McFadden | | 126/21 A |
| 2002/0134778 A1 | 9/2002 | Day et al. | | 219/681 |
| 2003/0024925 A1 | 2/2003 | Graves et al. | | 219/681 |
| 2003/0111464 A1 | 6/2003 | Yamauchi | | |
| 2004/0118392 A1 | 6/2004 | McFadden | | 126/21 A |
| 2004/0216732 A1* | 11/2004 | McFadden | | 126/21 A |
| 2005/0051540 A1 | 3/2005 | Ekinge et al. | | 219/681 |

FOREIGN PATENT DOCUMENTS

| | | |
|---|---|---|
| JP | 56044536 | 4/1981 |
| JP | 57166424 | 10/1982 |
| JP | 59035735 | 2/1984 |
| JP | 59202331 | 11/1984 |
| JP | 62129621 | 6/1987 |
| WO | WO96/41499 | 12/1996 |
| WO | WO96/41499 A | 12/1996 |
| WO | WO2004014139 | 2/2004 |

OTHER PUBLICATIONS

Supplementary European Search Report dated Dec. 11, 2009 in the corresponding application EP05849459.2.

Chinese Office Action dated Jul. 30, 2010 for corresponding Chinese Patent Application No. 200580047308.0 (with English translation).

Australian Office Action dated Aug. 27, 2010 for corresponding Australian Patent Application No. 2005316586.

* cited by examiner

IMPINGEMENT/CONVECTION/MICROWAVE OVEN AND METHOD

RELATED APPLICATION

This application claims the benefit of U.S. Provisional Patent Application, Ser. No. 60/635,857, filed Dec. 14, 2004, U.S. Provisional Patent Application, Ser. No. 60/682,594, filed May 19, 2005, and U.S. Provisional Patent Application, Ser. No. 60/735,241, filed Nov. 9, 2005, the entire contents of each of which are hereby incorporated by reference.

FIELD OF THE INVENTION

This invention relates to new and improved cooking ovens, systems, oven controllers and methods concerning microwave, convection and impingement cooking separately and in various combinations as well as cooling and interlock features for cooking ovens in general.

BACKGROUND OF THE INVENTION

A cooking oven that has both convection and impingement modes is shown in U.S. Pat. No. 5,345,923 as a countertop oven with one or more removable air impingement supply structures. Each air impingement supply structure includes a specially designed food rack disposed between upper and lower corrugated impingement air forming walls. The air impingement supply structures are removably inserted into the oven's air impingement supply structure cooking chamber for operation in the impingement mode. One or more of the air impingement supply structures can be removed and replaced by a standard food rack for operation in a convection mode. The countertop oven requires n specially designed food racks for n air impingement supply structures and up to n standard food racks. The countertop oven also uses a fan disposed adjacent a side wall of the oven chamber, which increases the side-to-side footprint of the oven.

A cooking oven that has both a microwave mode and an impingement mode is shown in U.S. Pat. No. 5,254,823 as an oven that has a rather large preheated thermal reservoir (at least 60 pounds) so as to facilitate rapid heat transfer to ambient air in a plenum. However, such an oven is quite heavy and cumbersome for many applications. Moreover, the preheat time is considerable (up to two or more hours) and cooling of the oven's exterior surfaces can be difficult and energy inefficient. The oven uses impingement air from a top of the oven's cooking chamber. This will brown or crisp the top of a food product but not the sides or bottom because the browning effect of the impingement jets is lost when the impingement jets merge to form a blanket or are reflected from oven chamber surfaces. The oven has a single microwave energy feed into the bottom of the cooking chamber. This results in uneven microwave cooking as the bottom of the food product is exposed to direct microwave energy and the top of the food is exposed to indirect microwave energy. Moreover, if metal pans are used, bottom feed microwave energy results in a large amount of reflected microwave energy to the bottom feed aperture, which can considerably reduce the useful life of the magnetrons.

There is a need for an oven that can cook food with microwave energy, impingement air and/or convection air.

There is a need for a microwave oven that can use metal pans with improved useful life of the magnetrons.

There is a further need for a light weight oven that has a small footprint.

SUMMARY OF THE INVENTION

A combination oven of the present invention comprises an oven chamber and at least one impingement air generator disposed in the oven chamber to provide impingement air that flows substantially in a vertical direction within the oven chamber. A microwave generator is disposed to provide microwave energy into the oven chamber via at least one wall of the oven chamber. A controller operates the oven in a microwave mode, an impingement mode or a combination microwave and impingement mode.

In one embodiment of the oven of the present invention, the wall is vertical.

In another embodiment of the oven of the present invention, the wall is a back wall or a side wall.

In another embodiment of the oven of the present invention, the microwave generator provides the microwave energy via two walls of the oven chamber.

In another embodiment of the oven of the present invention, the impingement air generator comprises a removable plate, a blower and an air heater.

In another embodiment of the oven of the present invention, the wall is a side wall and the oven further comprises a fan disposed in a fan box to circulate heated air between the fan box and the oven chamber via a baffle plate. The impingement air generator comprises a plate that converts a portion of the circulating air to the impingement air.

In another embodiment of the oven of the present invention, the plate is removable to convert the oven for operation in either a convection mode or a combination microwave and convection mode.

In another embodiment of the oven of the present invention, the plate is disposed near a bottom wall of the oven chamber so that the impingement air flows upwardly.

In another embodiment of the oven of the present invention, the plate is disposed near a top wall of the oven chamber so that the impingement air flows downwardly.

In another embodiment of the oven of the present invention, an additional plate is disposed near a top wall of the oven chamber so that another portion of the impingement air flows downwardly.

In another embodiment of the oven of the present invention, the plate has a handle to facilitate installation and removal by a sliding motion.

In another embodiment of the oven of the present invention, the plate comprises a front and opposed sides separated by a wall that contains an array of jet holes shaped to provide the impingement air.

In another embodiment of the oven of the present invention, the plate is installable in and removable from the oven chamber.

In another embodiment of the oven of the present invention, the plate is installed substantially flush with the baffle plate to receive circulating air from the fan box. The plate comprises a diverter to provide a substantially uniform pressure to the jet holes, whether located near or remote from the baffle plate.

In another embodiment of the oven of the present invention, the microwave generator also provides microwave energy into the oven chamber via an opposite side wall of the oven chamber. The microwave generator comprises one or more magnetrons and one or more wave guides to provide the microwave energy.

In another embodiment of the oven of the present invention, the oven comprises an outer enclosure comprising at least a first side wall and an additional wall that is substantially perpendicular to the first side wall and connected to the first side wall by a portion that is inwardly offset from the first side wall. An inner enclosure is disposed within and spaced from the outer enclosure by a passageway. A cooling fan is disposed within the passageway and is operable to maintain a flow of cooling air in the passageway between at least one intake port and one or more output ports. The intake port is located in the offset portion of the outer enclosure.

In another embodiment of the oven of the present invention, the outer enclosure further comprises a second side wall. The additional wall is inwardly offset from the second side wall by an additional offset portion. An additional intake port is located in the additional offset portion.

In another embodiment of the oven of the present invention, the offset portion comprises a first bevel between the additional wall and the first side wall, and wherein the additional offset portion comprises a second bevel between the additional wall and the second side wall.

In another embodiment of the oven of the present invention, the additional wall is a bottom wall.

In another embodiment of the oven of the present invention, the output port is located in a back wall of the outer enclosure.

In another embodiment of the oven of the present invention, an air filter disposed at the intake port.

In another embodiment of the oven of the present invention, a first air filter is disposed in the intake port and a second air filter is disposed at the second intake port.

In another embodiment of the oven of the present invention, a first air filter holder and a second air filter holder that enables easy installation and removal of the first air filter and the second air filter, respectively, are provided.

In another embodiment of the oven of the present invention, the first air filter holder and the second air filter holder are configured for installation and removal by a sliding motion of the respective air filters.

In another embodiment of the oven of the present invention, a source of cooking energy is disposed to provide cook energy to the inner enclosure to cook food therein.

A method of the present invention operates an oven that includes an oven chamber. The method comprises:

providing impingement air that flows substantially vertically in the oven chamber;

providing microwave energy into the oven chamber via at least one wall of the oven chamber; and controlling the oven such that it operates in either a microwave mode, an impingement mode or a combination microwave and impingement mode.

In one embodiment of the method of the present invention, the wall is vertical.

In another embodiment of the method of the present invention, the wall is a back wall or a side wall.

In another embodiment of the method of the present invention, the microwave energy is provided by a microwave generator via two walls of the oven chamber.

In another embodiment of the method of the present invention, a further step comprises installing in and removing from the oven chamber a removable impingement plate.

In another embodiment of the method of the present invention, the impingement plate is installable in and removable from the oven chamber with a sliding motion.

In another embodiment of the method of the present invention, the wall is a side wall and further steps comprise running a fan disposed in a fan box to circulate heated air between the fan box and the oven chamber via a baffle plate, and converting a portion of the circulating air to the impingement air.

In another embodiment of the method of the present invention, the converting step uses at least one impingement plate disposed in the oven chamber to convert the circulating air to impingement air.

In another embodiment of the method of the present invention, the impingement plate is removable to convert the oven for operation in a convection mode or a combination microwave and convection mode.

In another embodiment of the method of the present invention, the impingement plate is disposed near a bottom wall of the oven chamber so that the impingement air flows upwardly.

In another embodiment of the method of the present invention, the impingement plate is disposed near a top wall of the oven chamber so that the impingement air flows downwardly.

In another embodiment of the method of the present invention, an additional impingement plate is disposed near a top wall of the oven chamber so that another portion of the impingement air flows downwardly.

In another embodiment of the method of the present invention, further steps comprise installing and removing the impingement plate with a sliding motion.

In another embodiment of the method of the present invention, the impingement plate comprises a frame that includes a front and opposed sides separated by a wall that contains an array of jet holes shaped to provide the impingement air.

In another embodiment of the method of the present invention, the impingement plate further comprises a handle to facilitate installation and removal by a sliding motion.

In another embodiment of the method of the present invention, the impingement plate is installed substantially flush with the baffle plate to receive circulating air from the fan box, and wherein the impingement plate comprises a diverter to provide a substantially uniform pressure to the jet holes, whether located near or remote from the baffle plate.

In another embodiment of the method of the present invention, the microwave energy is also provided into the oven chamber via an opposite side wall of the oven chamber.

In another embodiment of the method of the present invention, the microwave energy is also provided into the oven chamber via an opposite side wall of the oven chamber.

Another method of the present invention comprises the steps of:

providing an outer enclosure comprising at least a first side wall and an additional wall that is substantially perpendicular to the first side wall and connected to the first side wall by a portion that is inwardly offset from the first side wall;

providing an inner enclosure disposed within and spaced from the outer enclosure by a passageway;

running a cooling fan that is disposed within the passageway to maintain a flow of cooling air in the passageway between at least one intake port and one or more output ports; and providing the intake port in the offset portion of the outer enclosure.

In another embodiment of the method of the present invention, the outer enclosure further comprises a second side wall. The additional wall is inwardly offset from the second side wall by an additional offset portion. An additional intake port is located in the additional offset portion.

In another embodiment of the method of the present invention, the offset portion comprises a first bevel between the additional wall and the first side wall. The additional offset portion comprises a second bevel between the additional wall and the second side wall.

In another embodiment of the method of the present invention, the additional wall is a bottom wall.

In another embodiment of the method of the present invention, the output port is located in a back wall of the outer enclosure.

In another embodiment of the method of the present invention, an air filter is disposed at the intake port.

In another embodiment of the method of the present invention, a first air filter is disposed at the intake port and a second air filter is disposed at the second intake port.

In another embodiment of the method of the present invention, a first air filter holder and a second air filter holder that enables easy installation and removal of the first air filter and the second air filter, respectively, are provided.

In another embodiment of the method of the present invention, the first air filter holder and the second air filter holder are configured for installation and removal by a sliding motion of the respective air filters.

In another embodiment of the method of the present invention, cook energy is provided to the inner enclosure to cook food therein.

Another oven of the present invention comprises a frame, a door and a hinge that is connected with the door and the frame for rotating the door about a pivot as the door is opened and closed. A cam moves as the door rotates. An interlock assembly comprises first and second switches and responds to the motion of the cam to activate the first and second switches in sequence as the door opens and closes.

In another embodiment of the oven of the present invention, the first and second switches are micro-switches.

In another embodiment of the oven of the present invention, the interlock assembly further comprises a plunger that is mounted for reciprocal motion and that activates the first and second micro-switches in response to the cam motion.

In another embodiment of the oven of the present invention, the plunger is shaped to control the sequence.

In another embodiment of the oven of the present invention, the first and second micro-switches comprise a first contact element and a second contact element, respectively, that are engaged by and tripped by the reciprocal motion of the plunger.

In another embodiment of the oven of the present invention, the plunger is shaped with first and second contours that are disposed in engagement with the first and second contact elements of the first and second micro-switches, respectively, wherein the first and second contours are shaped to activate the first and second micro-switches in sequence as the plunger is moved.

In another embodiment of the oven of the present invention, the interlock assembly further comprises a spring that compresses as the door closes and decompresses as the door opens to return the plunger to a door open position.

A system of the present invention comprises an oven chamber and an oven rack disposed in the oven chamber to hold a metal pan that contains the food product. A microwave generator provides microwave energy into the oven chamber via at least one vertical wall of the oven chamber to rapidly cook the food product. An impingement air generator that provides impingement air substantially in a vertical direction in the oven chamber to brown the food product.

In another embodiment of the system of the present invention, the microwave generator includes a microwave source that provides the microwave energy into the oven via a feed aperture in the vertical wall, and wherein the food rack is located below the feed aperture so as to minimize microwave energy incident to the feed aperture that is reflected by the metal pan, thereby prolonging the longevity of the microwave source.

In another embodiment of the system of the present invention, the vertical wall is a side wall of the oven chamber.

In another embodiment of the system of the present invention, the microwave generator also provides the microwave energy into the oven chamber via an opposite side wall.

In another embodiment of the system of the present invention, the impingement air generator comprises a plate that is manually installable and removable so as to convert the system back and forth between a combination of impingement and microwave and a combination of convection and microwave.

In another embodiment of the system of the present invention, a controller and a cooling fan that cools the microwave generator are provided. The controller regulates a speed of the cooling fan based on a temperature sensed by a probe in a vicinity of the microwave facility to reduce the speed as the sensed temperature falls and to increase the speed as the sensed temperature rises.

A controller of the present invention controls an oven that comprises at least one microwave generator. The controller comprises a processor and a memory containing a control program. The control program comprises one or more instructions that cause the processor to perform the steps of:
    sampling an output of a temperature sensor located in the vicinity of the microwave generator for a current temperature of the microwave generator;
    determining whether the current temperature is acceptable; and
    if the current temperature is unacceptable, causing the oven to be disabled.

In another embodiment of the controller of the present invention, the microwave generator comprises at least one magnetron.

In another embodiment of the controller of the present invention, the oven is disabled automatically or manually by an operator as instructed by an error message notification generated by the processor.

In another embodiment of the controller of the present invention, the current temperature is unacceptable if it is greater than a predetermined overheat temperature.

In another embodiment of the controller of the present invention, the current temperature is also unacceptable if it is less than a predetermined cold temperature.

In another embodiment of the controller of the present invention, the current temperature is unacceptable when the current temperature fails a comparison test with a reference value a predetermined number of times.

Another controller of the present invention controls an oven that comprises at least one microwave generator. The controller comprises a processor and a memory containing a control program. The control program comprises one or more instructions that cause the processor to run the microwave generator for N cooking stages and a remainder cooking stage at a predetermined duty cycle, where N is the total cooking time for a food product divided by a predetermined cooking stage period and the remainder is a remainder of the division.

In another embodiment of the controller of the present invention, the instructions cause the processor to perform the further steps of:
    calculating N and the remainder; and
    calculating the on and off time of the microwave generator for the N cooking stages and the remainder cooking stage, based on the predetermined duty cycle.

Another controller of the present invention controls an oven that comprises an oven chamber. The controller comprises a processor and a memory containing a control program. The control program comprises one or more instructions that cause the processor to control the oven for a cool down mode with steps comprising:

sampling an output of a temperature sensor located in the oven chamber for a current oven temperature;

determining if the current temperature is too hot;

if the current temperature is too hot, notifying an operator to place ice in the oven chamber;

repeating the sampling and determining steps until the oven chamber is determined to be cool; and notifying the user that the oven chamber is cool.

In another embodiment of the controller of the present invention, the instructions cause the processor to perform a further step of adjusting a speed of a cooling fan of the oven to a higher speed to assist in the cool down mode.

Another controller of the present invention controls an oven that comprises a cooling fan. The controller comprises a processor and a memory containing a control program. The control program comprises one or more instructions that cause the processor to control the cooling fan with steps comprising:

sampling an output of a temperature sensor for a current temperature; and adjusting a speed of the cooling fan based on the current temperature.

In another embodiment of the controller of the present invention, a location of the temperature sensor is selected from the group consisting of: ambient, oven chamber and temperature sensitive components.

Another controller of the present invention controls an oven. The controller comprises a processor and a memory containing a control program. The control program comprises one or more instructions that cause the processor to control an oven profile with steps comprising:

displaying to an operator a plurality of profile entry parameters;

modifying the profile entry parameters based on one or more inputs provided by the operator; and using the modified profile entry parameters to control the operation of the oven.

In another embodiment of the controller of the present invention, the profile entry parameters are selected from the group consisting of: language, alarm volume, alarm sound, manual mode, automatic mode and temperature units.

In another embodiment of the controller of the present invention, the profile entry parameters are sequentially displayed to the operator.

Another controller of the present invention controls an oven. The controller comprises a processor and a memory containing a control program. The control program comprises one or more instructions that cause the processor to control a transfer of data with a data carrying key with steps comprising:

detecting an input from a key reader that reads the key;

identifying from data carried by the key an operation of upgrade firmware, program download or program upload; and executing the identified operation.

In another embodiment of the controller of the present invention, the controller performs the further steps of:

transferring the data of the identified operation;

doing a checksum of the transferred data;

validating the transferred data; and notifying an operator that the operation is completed.

A method of the present invention uses a computer to control an oven that has at least one microwave generator. The method comprises:

sampling an output of a temperature sensor located in the vicinity of the microwave generator for a current temperature of the microwave generator;

determining whether the current temperature is acceptable; and if the current temperature is unacceptable, causing the oven to be disabled.

In another embodiment of the method of the present invention, the microwave generator comprises at least one magnetron.

In another embodiment of the method of the present invention, the oven is disabled automatically or manually by an operator as instructed by an error message notification generated by the processor.

In another embodiment of the method of the present invention, the current temperature is unacceptable if it is greater than a predetermined overheat temperature.

In another embodiment of the method of the present invention, the current temperature is also unacceptable if it is less than a predetermined cold temperature.

In another embodiment of the method of the present invention, the current temperature is unacceptable when the current temperature fails a comparison test with a reference value a predetermined number of times.

Another method of the present invention uses a computer to control an oven that comprises at least one microwave generator. The method comprises:

running the microwave generator for N cooking stages and a remainder cooking stage at a predetermined duty cycle, where N is the total cooking time for a food product divided by a predetermined cooking stage period and the remainder is a remainder of the division.

In another embodiment of the method of the present invention, the method further comprises:

calculating N and the remainder; and calculating the on and off time of the microwave generator for the N cooking stages and the remainder cooking stage, based on the predetermined duty cycle.

Another method of the present invention uses a computer to control an oven that comprises an oven chamber. The method comprises:

sampling an output of a temperature sensor located in the oven chamber for a current oven temperature;

determining if the current temperature is too hot;

if the current temperature is too hot, notifying an operator to place ice in the oven chamber;

repeating the sampling and determining steps until the oven chamber is determined to be cool; and notifying the user that the oven chamber is cool.

In another embodiment of the method of the present invention, the method further comprises: adjusting a speed of a cooling fan of the oven to a higher speed to assist in the cool down mode.

Another method of the present invention uses a computer to control an oven that comprises a cooling fan. The method comprises:

sampling an output of a temperature sensor for a current temperature; and adjusting a speed of the cooling fan based on the current temperature.

In another embodiment of the method of the present invention, a location of the temperature sensor is selected from the group consisting of: ambient, oven chamber and temperature sensitive components.

Another method of the present invention uses a computer to control an oven. The method comprises:

displaying to an operator a plurality of profile entry parameters;

modifying the profile entry parameters based on one or more inputs provided by the operator; and using the modified profile entry parameters to control the operation of the oven.

In another embodiment of the method of the present invention, the profile entry parameters are selected from the group consisting of: language, alarm volume, alarm sound, manual mode, automatic mode and temperature units.

In another embodiment of the method of the present invention, the profile entry parameters are sequentially displayed to the operator.

Another method of the present invention uses a computer and a data carrying key to control an oven. The method comprises:

detecting an input from a key reader that reads the key;

identifying from data carried by the key an operation of upgrade firmware, program download or program upload; and executing the identified operation.

In another embodiment of the method of the present invention, the method further comprises:

transferring the data of the identified operation;

doing a checksum of the transferred data;

validating the transferred data; and notifying an operator that the operation is completed.

BRIEF DESCRIPTION OF THE DRAWINGS

Other and further objects, advantages and features of the present invention will be understood by reference to the following specification in conjunction with the accompanying drawings, in which like reference characters denote like elements of structure and.

DESCRIPTION OF THE PREFERRED EMBODIMENT

Figure 1:
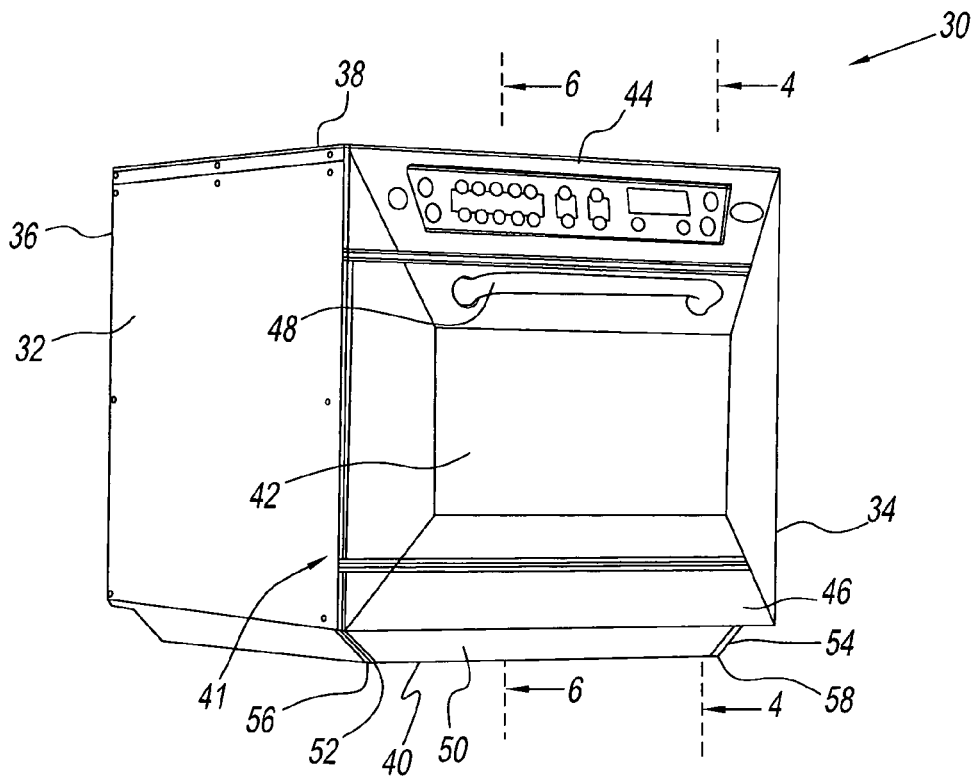
FIG. 1 is a perspective view of the oven of the present invention.
Figures 2, 3:
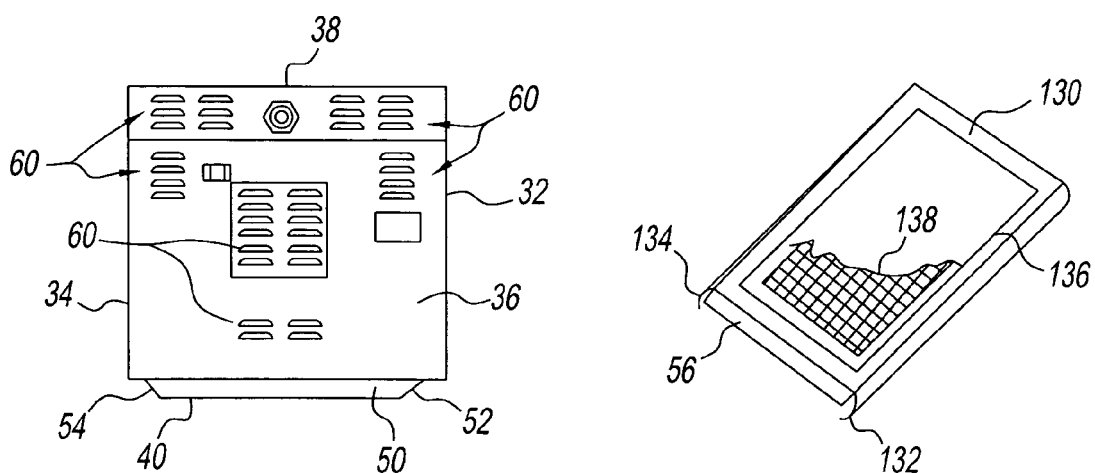
FIG. 2 is a rear view of the oven of FIG. 1.
FIG. 3 is a perspective view of an air filter frame for the oven of FIG. 1.

Referring to FIGS. 1 and 2, a combination oven 30 of the present invention comprises a pair of outer side walls 32 and 34, an outer back wall 36, an outer top wall 38, an outer bottom wall 40 and a front wall 41, all of which comprise an outer enclosure. Front wall 41 comprises a door 42, a control panel 44 above door 42 and a grease drawer 46 below door 42. A handle 48 is disposed on door 42 for opening the door in a pull down manner.

Outer bottom wall 40 is offset from outer side walls 32 and 34, outer back wall 36 and front wall 41. The offset is preferably a bevel 50, but could be have other shapes. An air intake port 52 and an air intake port 54 are located in opposed sides of bevel 50 adjacent outer side walls 32 and 34, respectively. Air filters 56 and 58 are disposed at air intake ports 52 and 54, respectively. Ambient air is taken in via air intake ports 52 and 54 to cool various control parts, a fan motor (not shown), outer side walls 32 and 34, outer bottom wall 40 and outer top wall 38 and outer back wall 36. The cooling air exits oven 30 via a plurality of louvers 60 disposed in outer back wall 36.

Combination oven 30 is configurable for operation in a convection mode, an impingement mode, a microwave mode, a combination convection and microwave mode, a combination impingement and microwave mode and a combination microwave, impingement and convection mode.

Figure 4:
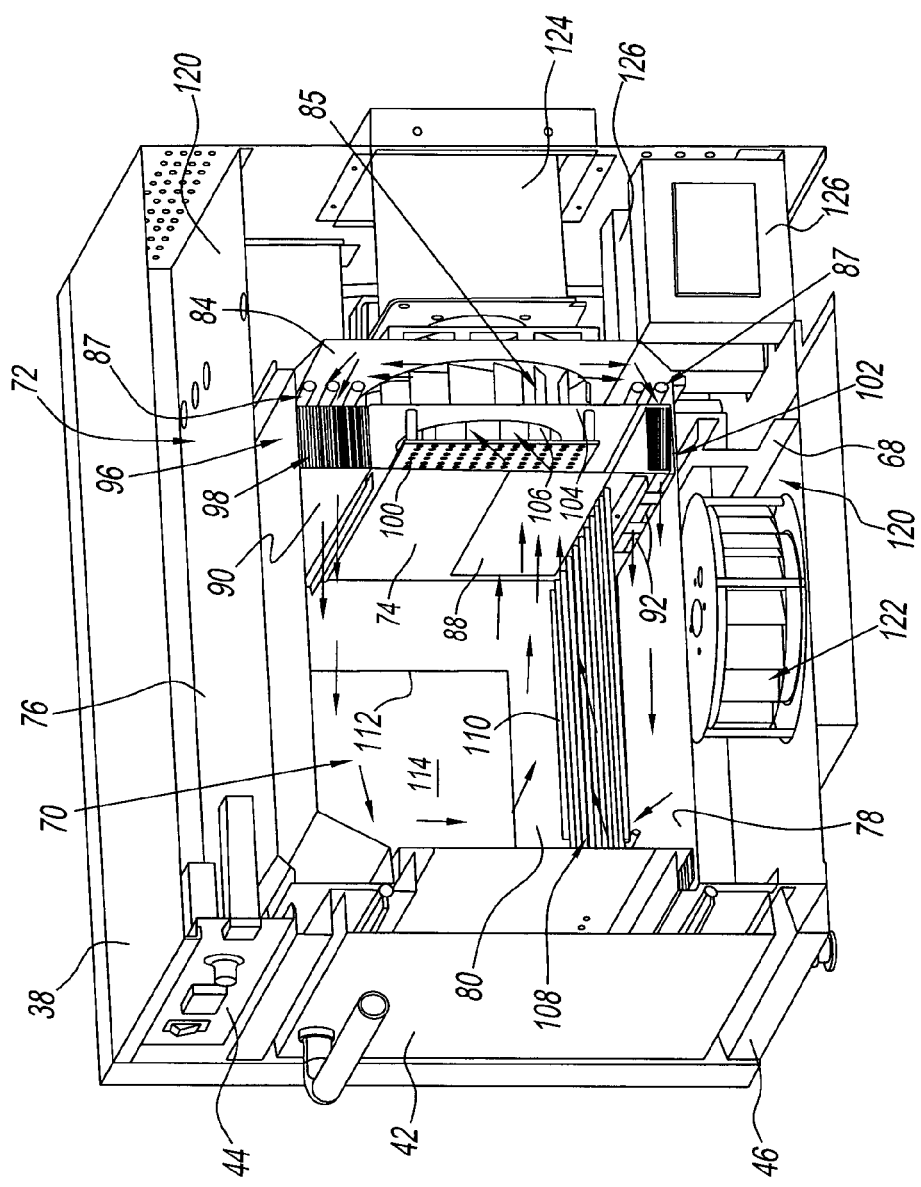
FIG. 4 is a cross-sectional view along line 4 of FIG. 1 that depicts the oven in a convection mode.

Referring to FIG. 4, combination oven 30 is shown configured for a convection mode. Combination oven 30 comprises an oven chamber 70 and a fan box 72 supported by a support structure 68, which is mechanically connected to outer bottom wall 40 and outer side walls 32 and 34. Oven chamber 70 and fan box 72 share an inner top wall 76, an inner bottom wall 78 and inner side walls 80 and 82, inner side wall 82 being shown only in FIGS. 6 and 7. Oven chamber 70 and fan box 72 also share a vertically disposed baffle plate 74. Thus, oven chamber 70 comprises door 42, baffle plate 74, inner top wall 76, inner bottom wall 78 and inner side walls 80 and 82. Fan box 72 comprises baffle plate 74, inner top wall 76, inner bottom wall 78, inner side walls 80 and 82 and an inner back wall 84. A fan 85 is disposed in fan box 72 and a heater 87 is disposed downstream of fan 85. Fan 85 may be any fan suitable for circulating heated air in an oven. Preferably, fan 85 is a three phase cage induction motor suitable for inverter drive, preferably L7FWDS-638 manufactured by Hanning. Heater 87 may be any heater (gas or electric) suitable for heating circulating air in a convection and/or impingement air oven. Preferably, heater 87 is an electrical heater having one or more heating elements disposed above and below the blades of fan 85.

Figure 7:
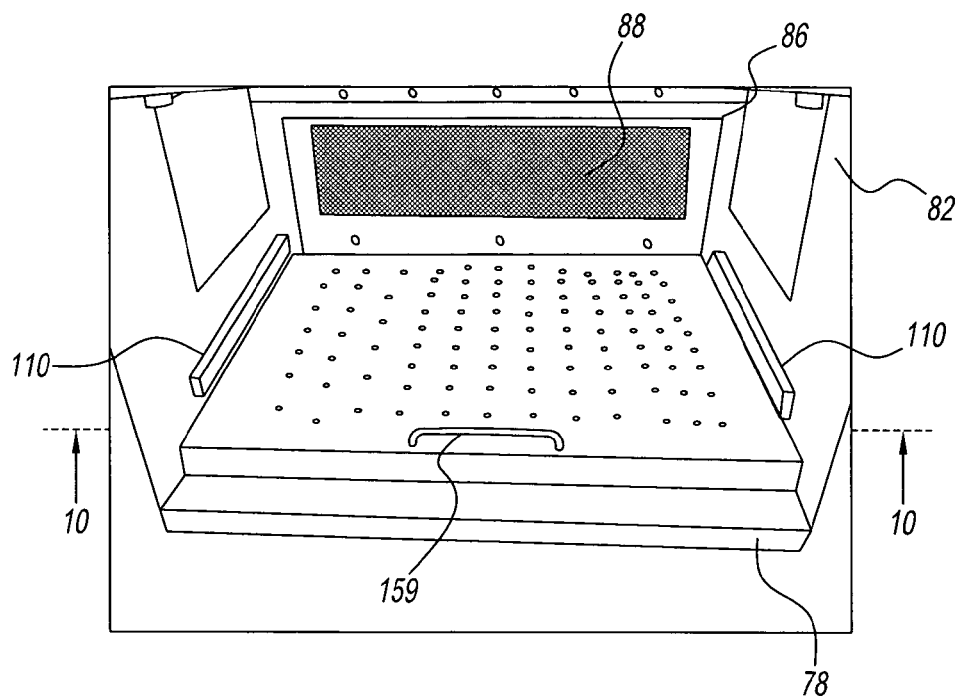
FIG. 7 is a perspective view of a portion of the oven of FIG. 1 with the oven door open that depicts the lower impingement plate installed.
Figure 8:
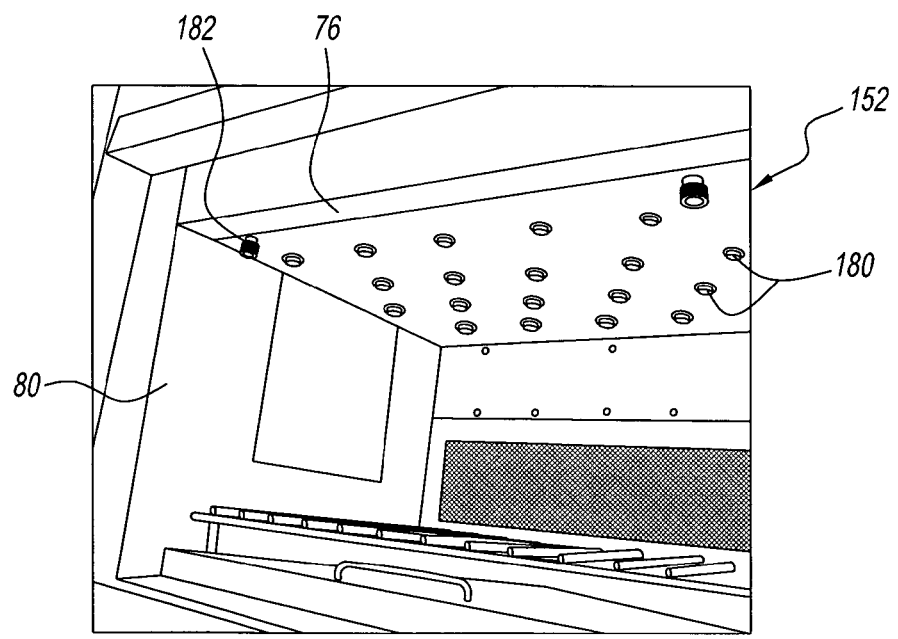
FIG. 8 is a perspective view of a portion of the oven of FIG. 1 with the oven door open that depicts the upper impingement plate installed.

Referring to FIGS. 4 and 7, baffle plate 74 comprises a plurality of openings to provide a path for air to circulate between oven chamber 70 and fan box 72. A first opening 86 (shown only in FIG. 7) is located above the bottom of baffle plate 74. A grease filter 88 is mounted to baffle plate 74 to cover opening 86, which is preferably at least partially in registration with fan 85. A second opening 90 is located at or near the top of baffle plate 74. One or more third openings 92 are located near the bottom of baffle plate 74.

Grease filter 88 is advantageously located upstream airflow to the suction side of fan 85 to filter grease and/or other particles from the circulating air stream before reaching the blades of fan 85. Grease filter 88 is also located in a readily accessible position for removal and cleaning.

The oven chamber inner walls 80 and 82 are shaped so that grease and other liquid flows downwardly toward grease drawer or pan 46. Since grease drawer 46 is readily removable, it is easy to clean.

A catalyst structure 96 is disposed in fan box 72 between fan 85 and baffle plate 74. Catalyst structure 96 comprises a catalyst 98, a catalyst 100 and a catalyst 102. Catalyst 98 is disposed adjacent inner top wall 76 in at least partial registration with opening 90 of baffle plate 74. Catalyst 100 is disposed at least in partial registration with grease filter 88 and fan 85. Catalyst 102 is disposed in registration with openings 92. A fan cover 104 has an opening 106 and is disposed between fan 85 and catalyst 100 so that opening 106 is in registration with fan 85 and catalyst 100.

Catalyst 100 may suitably be a sheet material with a plurality of apertures. For example, catalyst 100 may be 12×12 0.041 inch diameter open wire mesh available from Englehard. Catalysts 98 and 102 may suitably be 0.0006 inches metal foil hemingbone pattern substrate with platinum catalyst 105 cell per square inch available from Englehard.

Figure 6:
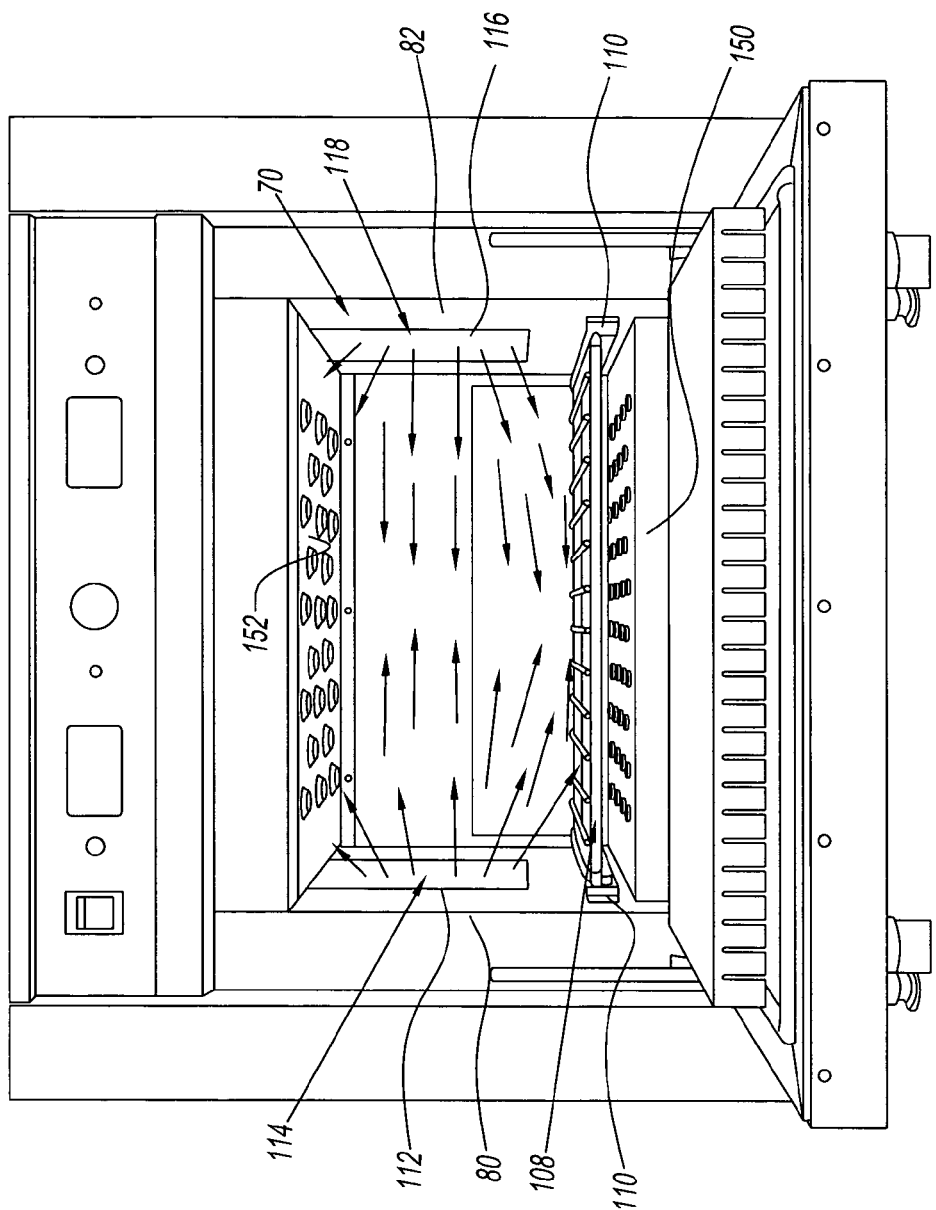
FIG. 6 is a view along line 4 of FIG. 1 that depicts the oven in a microwave mode.

Referring to FIGS. 4 and 6, an oven rack 108 is disposed in oven chamber 70 on supports 110 mounted to inner side walls 80 and 82 so that oven rack 108 is near the bottom of grease filter 88 and above openings 92. Oven rack 108 may be a standard food rack, i.e., available off-shelf. A microwave opening 112 is disposed in inner side wall 80 and a microwave opening 116 is disposed in inner side wall 82. A cover 114 and a cover 118 are disposed to cover openings 112 and 116, respectively. Covers 114 and 118 are microwave transparent. For example, the covers may be a suitable ceramic or other microwave transparent material.

Outer walls 32, 34, 36, 38 and 40, which comprise an outer enclosure, inner walls 76, 78, 80, 82 and 84, which comprise an inner enclosure, and baffle plate 74 are preferably a metal, such as stainless steel.

Inner walls 76, 78, 80, 82 and 84 are separated from outer walls 32, 34, 36, 38 and 40 by a passageway 120 for cooling air in combination oven 30. A cooling fan 122 is disposed in passageway 120 below oven chamber 70 and between outer bottom wall 40 and inner bottom wall 78. A fan motor compartment 124 and one or more microwave generators 126 (e.g., magnetrons) are disposed in passageway 120 between outer back wall 36 and inner back wall 84. A fan motor (not shown) is disposed in fan motor compartment 124 and is coupled to rotate fan 85. A suitable thermal insulation (not shown) is disposed in passageway 120 about oven chamber 70 and fan box 72.

Referring to FIGS. 1-3, there is shown an air filter holder 130 that permits easy installation and removal of air filter 56. To this end, air filter holder 130 comprises flanges 132 and 134 that are shaped for installation and removal of air filter 56 by a sliding motion. Air filter holder 130 also comprises an opening 136 that is in registration with air intake port 52. Air filter holder 130 is mounted to bevel 50 by any suitable fastener, such as screws. Alternatively, air filter holder 130 can be formed in bevel 50 by stamping or other metal working process. It will be apparent to those skilled in the art that a similar air filter holder 130 is provided for air filter 58. Air filters 56 and 58 each comprise an array of perforations. For example, the perforations may simply be the mesh of a screen, such as screen 138, a portion of which is shown for air filter 56.

Referring to FIGS. 1-5, cooling fan 122 is operable to circulate cooling air in passageway 120. The cooling air is drawn into passageway 120 from ambient via air intake ports 52 and 54 and flows through passageway 120 and exits via louvers 60 in outer back wall 36 to cool various control parts, the fan motor (not shown), microwave generators 126, outer side walls 32 and 34, outer bottom wall 40, outer top wall 38 and outer back wall 36. By locating air intake ports 52 and 54 in bevel 50, combination oven 30 can be located side by side with other structures (e.g., a wall), i.e., outer side walls 32 and 34 being flush against the other structures. This conserves space and allows combination oven 30 to have a smaller footprint than prior ovens.

For convection operation of combination oven 30, fan 85 circulates air drawn from oven chamber 70 into fan box 72 via grease filter 88 and catalyst 100. The air is heated by heater 87 and circulated to oven chamber via catalyst 98 and catalyst 102. Grease filter 88 and catalyst 100 function to remove contaminates (e.g., grease particles and other contaminates) from the air prior to contact with fan 85. Catalysts 98 and 102 function to further purify the air prior to circulation into oven chamber 70.

Figure 5:
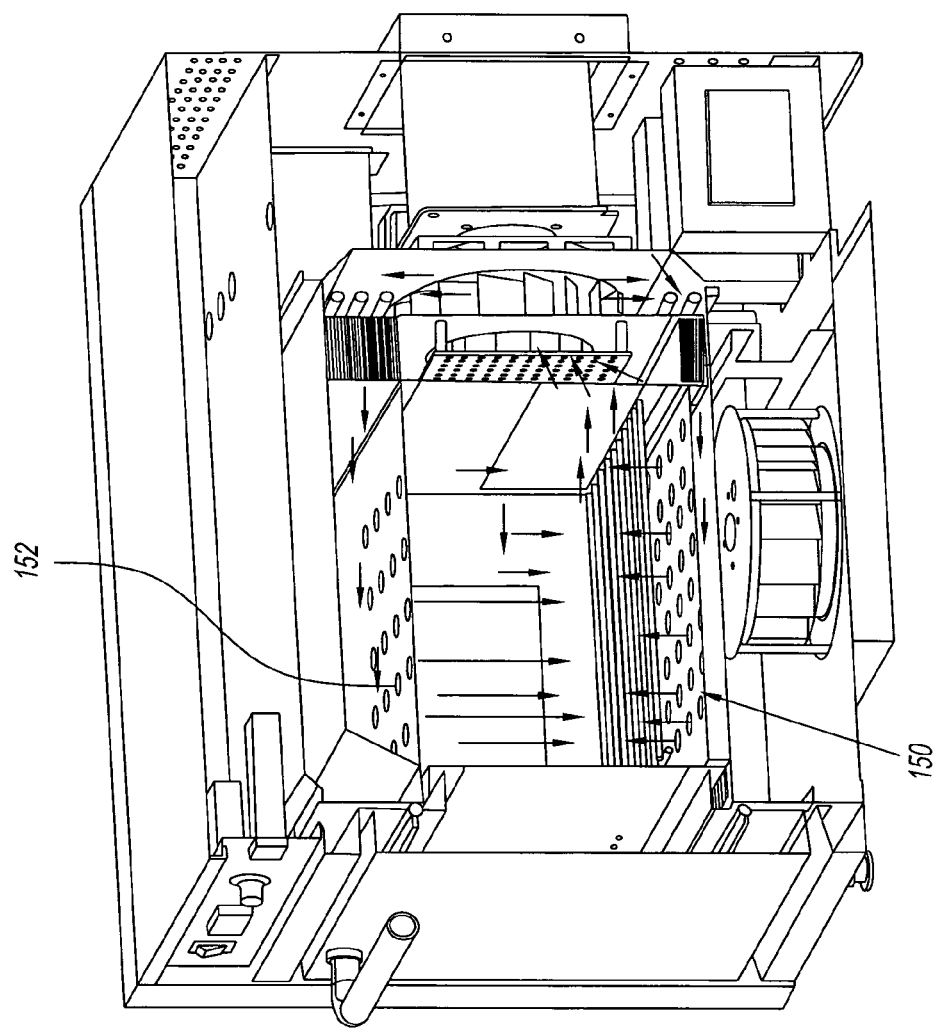
FIG. 5 is a cross-sectional view along line 4 of FIG. 1 that depicts the oven in an impingement mode.
Figure 9:
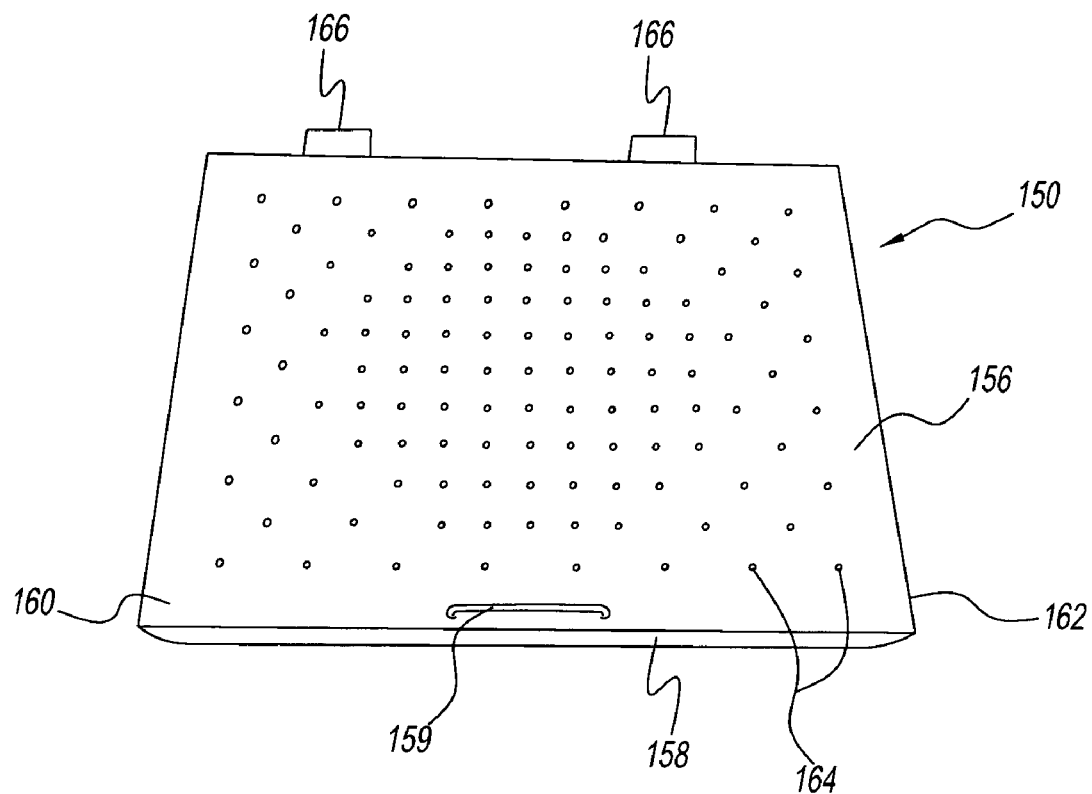
FIG. 9 is a top view of the lower impingement plate of the oven of FIG. 1.
Figure 10:
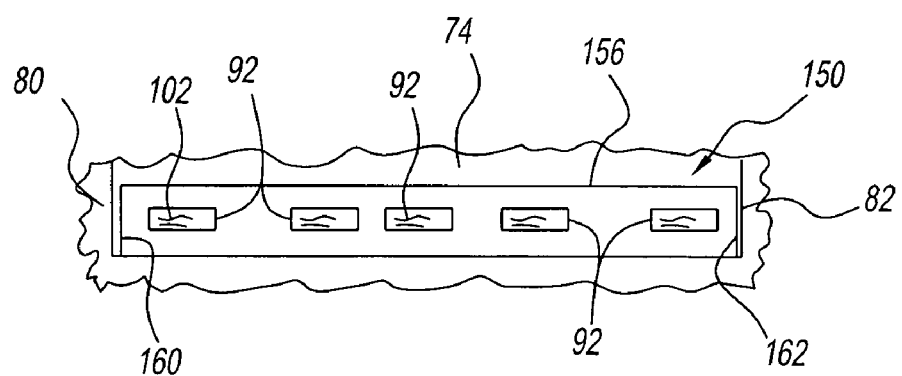
FIG. 10 is a cross-sectional view of FIG. 7 along line 10.

Referring to FIG. 5, combination oven 30 is also configurable in an impingement mode by installing removable lower and/or upper impingement plates 150 and 152, respectively. Referring also to FIGS. 7 and 9, lower impingement plate 150 comprises a frame 154 that has a top side 156, a front side 158, a left side 160 and a right side 162. Top side 156 comprises an array of jet holes 164 shaped to provide jets or columns of impingement air. Frame 154 is dimensioned for installation by sliding motion along inner bottom wall 78. To facilitate installation and removal, a handle 159 is disposed on top side 156. Also, as shown in FIG. 9, one or more guides or locators 166 are provided to assure that frame 154 is installed flush with baffle plate 74 to minimize air leakage. Guides 166 mate with similar guides in baffle plate 74. Guides 166 and their mating guides may be any suitable guides that mate, e.g., tab and slot, flange and flange, and other mating guides.

When installed, impingement plate 150 forms with inner bottom wall 78 an impingement plenum that is in fluid communication with fan box 72 via openings 92 in baffle plate 74. Thus, airflow from fan box 72 through holes 92 pressurizes lower impingement plate 150 to provide jets or columns impingement of impingement air toward oven rack 108, as indicated by the vertical upwardly extending arrows in FIG. 5.

Referring to FIG. 9, perforations or jet holes 164 in a central area of top side 156 of impingement plate 150 are shown as closely spaced. This directs most of the impingement air to a central area of oven rack 108 so as to impinge directly on the food product. There are fewer jet holes 164 (less closely spaced jet holes) near the edges. This assures that most of the impingement air will be concentrated toward the center for food products like pizza.

Referring to FIGS. 5, 8, 11 and 12, upper impingement plate 152 comprises a comprises a frame 170 that has a bottom side 172, a front side 174, a left side 176 and a right side 178. Bottom side 172 comprises an array of jet holes 180 shaped to provide jets or columns of impingement air as indicated by the vertical downwardly extending arrows in FIG. 5. Front side 174, left side 176 and right side 178 extend above bottom side 172. Front side 174, left side 176 and right side 178 are fastened to bottom plate 172 by any suitable fastener, such as screws, weldment or other suitable fastener. Alternatively, frame 170 can be formed as an integral one-piece construction. Frame 170 is dimensioned for installation in oven chamber 70 against inner top wall 76 and baffle plate 74 in registration with opening 90 and catalyst 98. Upper impingement plate 152 is installed with fasteners, such as screws 182 to inner top wall 76.

Figure 11:
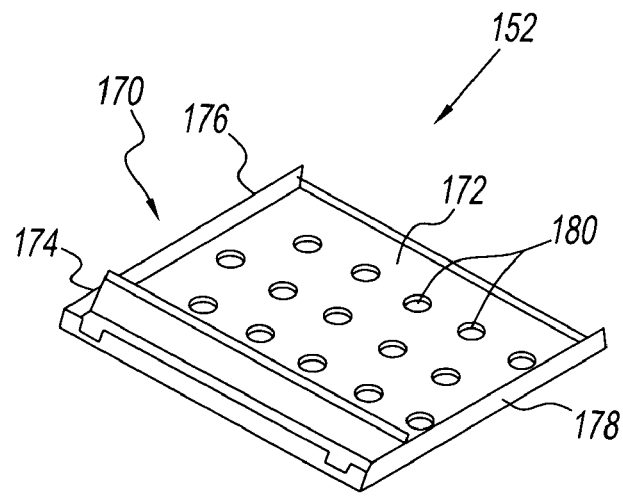
FIG. 11 is a perspective view of the upper impingement plate of the oven of FIG. 1.
Figure 12:
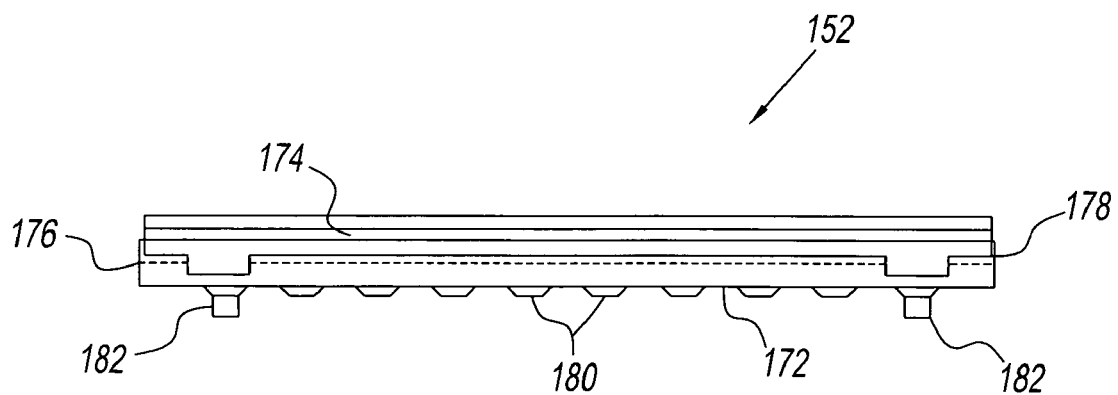
FIG. 12 is a front view of the upper impingement plate of the oven of FIG. 1.

Upper impingement plate 152 together with inner top wall 76 and inner side walls 80 and 82 of oven chamber 70 form a delivery plenum for the airflow through catalyst 98 to jet holes 180. As shown in FIGS. 11 and 12, front side 174 is angled for an air diversion function to provide a more uniform air pressure throughout the delivery plenum to assure that the air jets 180 remote from the airflow entry at opening 90 have the same velocity as those that are nearer to opening 90. If desired, the lower impingement plate could also be provided with an air diverter.

For impingement operation of combination oven 30, fan 85 circulates air drawn from oven chamber 70 into fan box 72 via grease filter 88 and catalyst 100. The air is heated by heater 87 and circulated to oven chamber via catalysts 98 and 102 and lower and upper impingement plates 150 and 152, respectively. As in the convection mode, grease filter 88 and catalyst 100 function to remove contaminates (e.g., grease particles and other contaminates) from the air prior to contact with fan 85. Catalysts 98 and 102 function to further purify the air prior to circulation into lower and upper impingement plates 150 and 152 for delivery as impingement air to oven chamber 70.

Combination oven 30 can also be operated in microwave and both impingement and convection mode by removal of either upper impingement plate 152 or lower impingement plate 150, but not both. If both impingement plates 150 and 152 are removed, oven 3 will function in a convection mode or a combination convection and microwave mode.

Referring to FIG. 6, combination oven 30 is configured in a combination microwave and impingement mode. Upper and lower impingement plates 150 and 152 are installed. A microwave generator comprising one or more magnetrons 126 (FIG. 4) and a pair of wave-guides (not shown) provides microwave energy through entry openings or ports 112 and 116 disposed in inner side walls 80 and 82, respectively. The wave-guides extend from microwave generators 126 in passageway 120 (FIGS. 4 and 5) to openings 112 and 116. This combination of microwave energy feed from opposed inner side walls 80 and 82 and impingement air from above and/or below is a significant feature of the present invention. Microwave energy from both inner side walls 80 and 82 provide direct microwave energy to the sides, top and bottom of a food product disposed on food rack 108. Impingement air from above and below impinges and browns the top and bottom of the food product. If browning is not desired on the bottom, for example, lower impingement plate 150 is removed. The oven then is configured for microwave, impingement (from the top) and convection. An alternative arrangement would be the removal of upper impingement plate 152 while retaining lower impingement plate 150 for products that require bottom browning and a gentle convection heat, i.e., delicate pastries. Due to microwave energy being launched from one or more side walls, metal pans can be used in oven 30. By locating oven rack 108 below microwave feed ports 112 and 116, low profile metal pans, such as those used for baking pastries and other foods, can be used to hold food products during cooking without reflected microwave energy seriously impairing the useful life of magnetrons 126.

Microwave energy is signified in FIG. 6 with arrows directed into oven chamber 70 from openings 112 and 116. Impingement cooking is signified by the arrows in FIG. 4.

Cooling fan 122 is preferably a variable speed fan so as to minimize noise and energy consumption while still maintaining low temperature of critical components. This is to be contrasted with known ovens that have a fixed speed cooling fan that is always on or a delayed turn-on and a delayed turn-off. Combination oven 30 comprises a temperature probe (not shown) that is located (e.g., in the vicinity of magnetrons 126) to provide a signal proportional to temperature of critical or temperature sensitive components. An oven controller (not shown) uses the signal to regulate the cooling fan speed accordingly. As an example, a magnetron will only generate heat while it is operating, thereby requiring a relatively large amount of cooling air to keep the temperature sensitive components from overheating. When the magnetron is turned off, only a small amount of cooling air is needed to maintain certain areas under a maximum temperature. Regulating the cooling fan speed based on a measure of the temperature of the temperature sensitive components, not only saves energy spent by the cooling fan, but also minimizes heat loss from the oven cavity insulation. This feature also allows the controller to alert an operator for over heating conditions due to high temperature ambient air as well as due to a clogged air filter.

Figure 13:
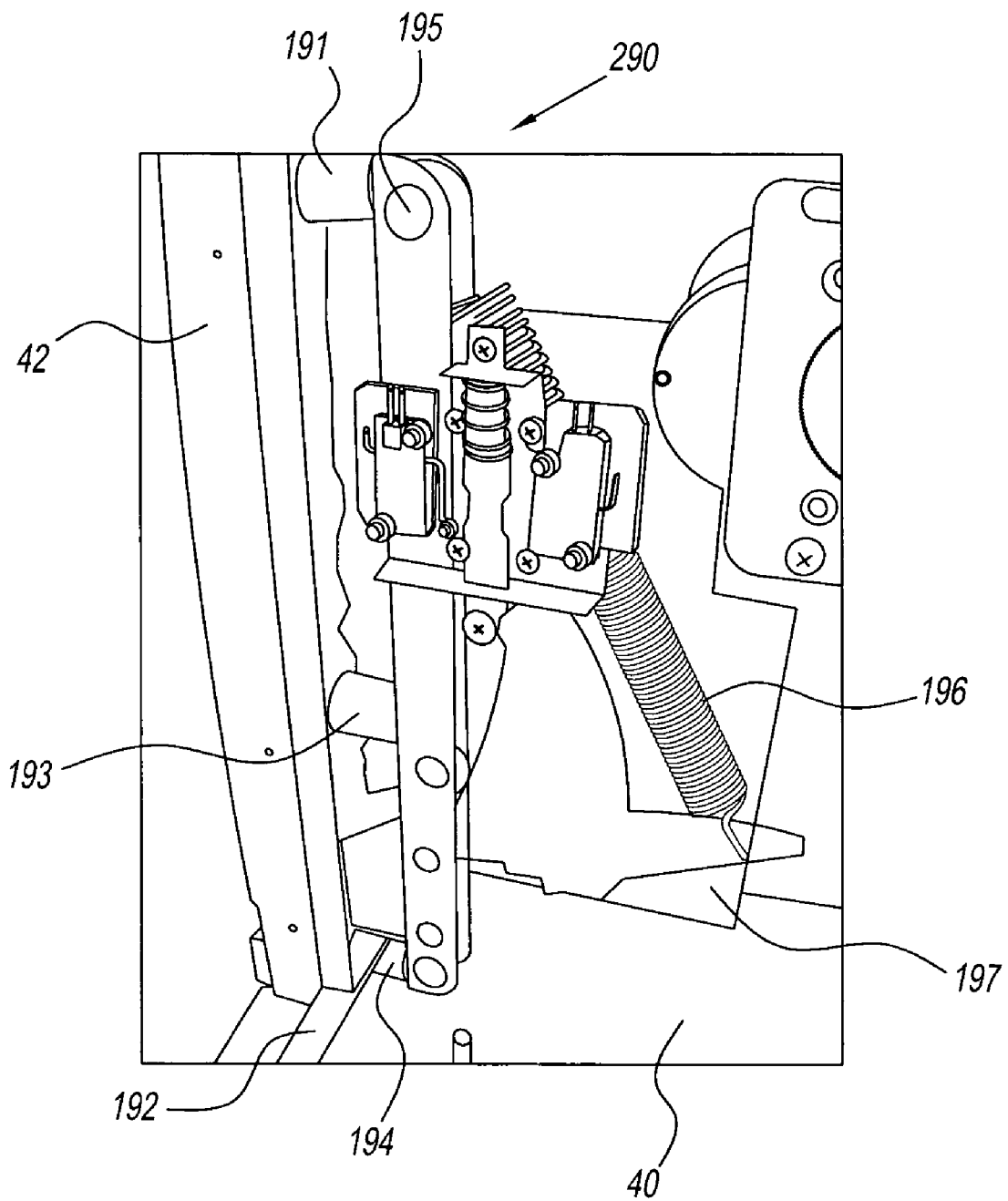
FIG. 13 is a detail view of an interlock assembly mounted in place on a hinge of the door of the oven of FIG. 1.
Figure 14:
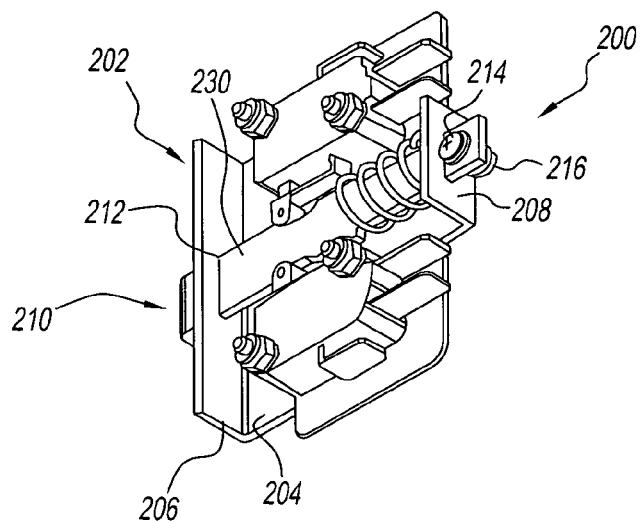
FIG. 14 is a perspective view of the interlock assembly of FIG. 13.
Figure 15:
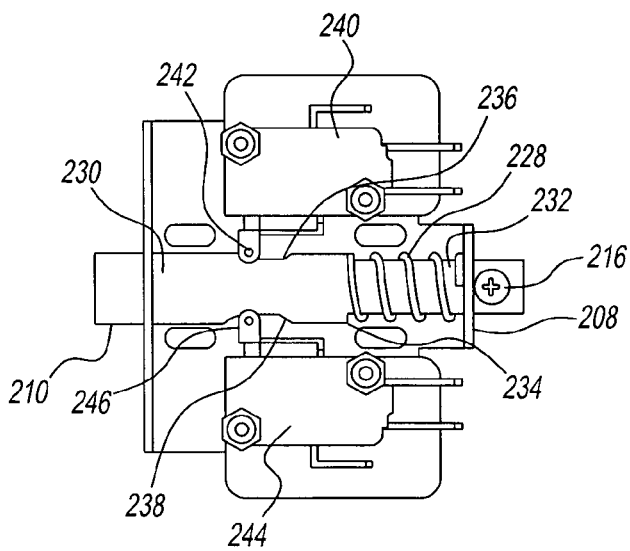
FIG. 15 is a top view of the interlock assembly of FIG. 14.
Figure 16:
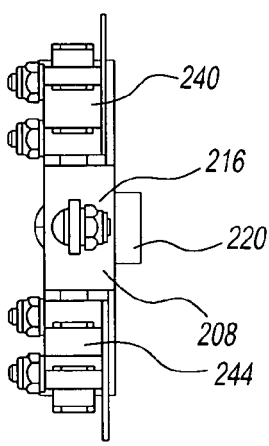
FIG. 16 is a front view of the interlock assembly of FIG. 14.
Figure 17:
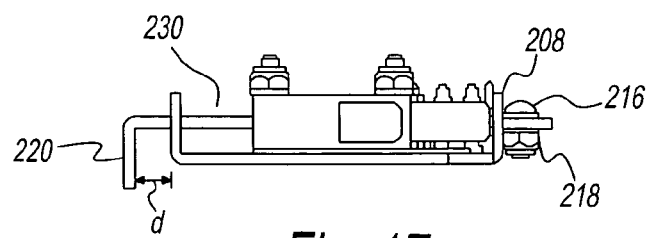
FIG. 17 is a side view of the interlock assembly of FIG. 13

Referring to FIG. 13, combination oven 30 of the present invention also comprises an interlock switch assembly 200 that is disposed on a hinge 190 that is fastened to door 42 by fasteners 191 and 193 and to a frame 192 by a fastener 194. Frame 192 is supported by bottom wall 40. Hinge 190 comprises a pivot 195, which is coupled by a spring 196 to a cam 197.

Figure 18:
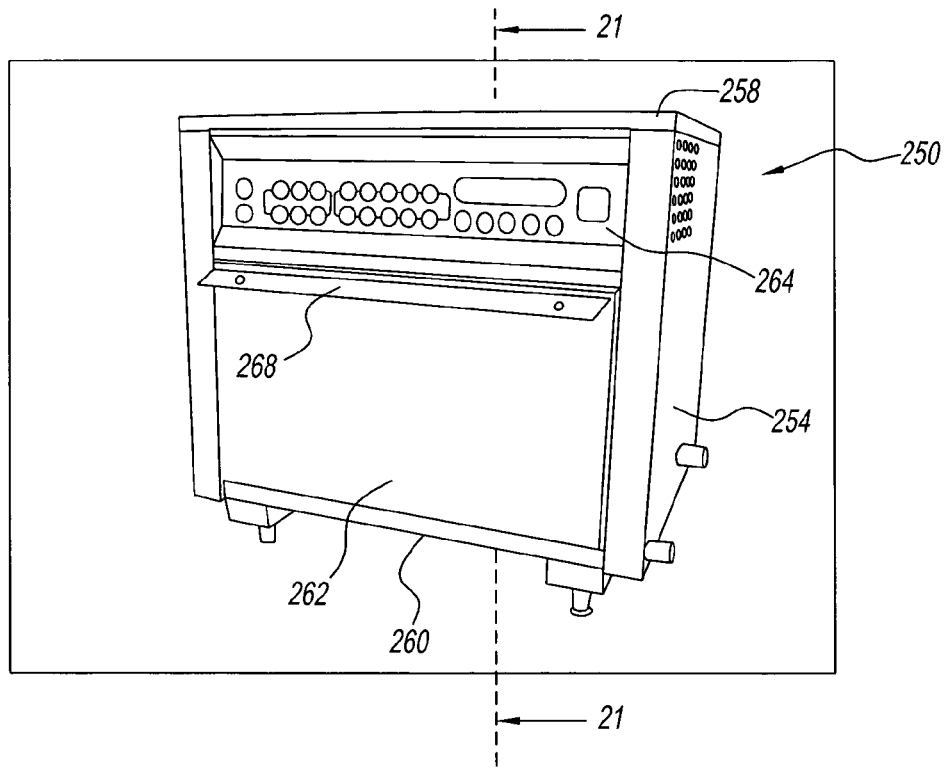
FIG. 18 is a perspective view of another embodiment of the oven of the present invention.

Referring to FIGS. 14-17, interlock assembly 200 includes an angled bracket 202 that comprises a first portion 204 and end portions 206 and 208 that extend at an angle, preferably a right angle, thereto, at spaced apart locations. Preferably, the spaced apart locations are at opposed ends of portion 204. A plunger 210 has a portion 230 that extends through openings 212 and 214 of portions 206 and 208 of bracket 202, respectively. A fastener 216 extends through an opening 218 in portion 230 of plunger 210 just outside portion 208 of bracket 202. Plunger 210 has a right angle portion 220 just outside of portion 206 of bracket 202 by a distance depicted as d in FIG. 18. The motion of plunger 210 is limited to the distance d by the locations of fastener 216 and right angle portion 220. Plunger portion 230 comprises a neck section 232 that carries a spring 228 between a stop 234 thereof and portion 208 of bracket 202.

Plunger portion 230 also comprises a cam surface 236 and a cam surface 238. A micro-switch 240 has a contact element 242 in contact with cam surface 236. A micro-switch 244 has a contact element 246 in contact with cam surface 238. Cam surfaces 236 and 238 are shaped such that micro-switches 240 and 244 are activated in sequence as plunger moves to the right or the left as viewed in FIG. 15. For example, the ramps to the left side of cam surfaces 236 and 238 are offset from one another by an amount that yields the time differential in the sequence of activation, i.e., the turning on and off of micro-switches 240 and 244. The motion of plunger 210 is controlled by the motion of cam 197 as oven door 42 rotates about hinge 190 of combination oven 30.

Referring also to FIG. 13, the position of plunger 210 is as shown in FIGS. 14-17 when door 42 is open. Spring 228 is in its least compressed condition. As door 42 is closed, cam 197 engages and moves plunger 210 up in FIG. 13 (to the right in FIGS. 14-17). As plunger 210 moves to the right (FIG. 15), contact elements 242 and 246 encounter the left hand ramps of cam surfaces 236 and 238 in sequence to activate their respective micro-switches 240 and 244. For the purpose of description, it is assumed that the left hand ramp of cam surface 236 is encountered first (its ramp is offset slightly to the right from that of cam surface 238). Thus, as door 42 is closed, micro-switch 240 is activated first and then micro-switch 244 is activated. As plunger 210 moves to the right, spring 228 compresses.

When door 42 is opened, spring 228 decompresses and returns plunger 210 to the position shown in FIGS. 14-17. As plunger 210 moves to the left, micro-switch 244 is activated first and then micro-switch 240 is activated. Micro-switches 240 and 244 are connectable in circuit with other components to shut off microwave power, oven heating and reduces fan speed to 10% airflow as door 42 opens. The assembly is robust enough to assure the correct sequencing of micro-switches 240 and 244 even upon the occurrence of jarring events, such as slamming of the oven door.

A substantially identical interlock assembly is incorporated in the hinge assembly for the other side of door 42. In addition, the switch assembly application (two interlock assemblies, one on each door hinge) serve to comply with the UL923 safety standard requiring a crowbar circuit to render the unit safe if a switch were to fail.

A control system (not shown) generates continuous reduced microwave power without generating large current flicker in the mains power supply. This is only applicable in a microwave oven containing N magnetrons (N>1) where the filament current is supplied separate from the high voltage transformers. There are two advantages with this arrangement. First, the food quality of items rises during cooking.

Due to high complexity of cooking parameters for the variable speed impingement microwave mode, the controller includes a special control mode that aids in the recipe cooking parameters. The controller asks for certain parameters and then suggests suitable cooking parameters. When the cooking is finished, the controller poses questions to evaluate the desired quality and modifies the cooking parameters automatically with a possible manual override. This will continue until a satisfactory result has been achieved and the program can be stored automatically in the controller. As described below with reference to FIG. 22, the controller comprises a CPU (central processing unit), a switching unit with variable speed drive for fans, a key reader, an input switch matrix, an alarm/beeper, a non-volatile memory, a cavity temperature sensor, magnetron temperature sensors and a display module. The controller includes the features of uploading and downloading cooking programs (500×8 stages). The controller also includes a cool down mode that allows a 24/7 store operator to rapidly cool down the oven using ice. This process is fully automated and only advises the operator when the oven is cool and safe to clean. The controller also has a configuration or profile mode that allows individual customers to set up their preferred mode of operation, i.e., manual or programmed or preprogrammed only. Other variables that can be either set by the menu key or by the operator are beeper loudness, language, oven operating temperature band (to insure consistent cooking results), Degrees F or C and whether during operation the actual oven temperature or the set temperature is displayed. To eliminate prevention of the oven operating due to a drop in cavity temperature when the door is opened the controller utilizes an averaging mode where a temperature measurement is taken every 30 seconds and the actual oven temperature is calculated from the average of the last ten readings. Also to help in this area the controller switches the heater on for a fixed period whenever the door is opened.

Referring to FIGS. 18-21, another embodiment of the oven of the present invention is shown as oven 250. Oven 250 comprises a pair of outer side walls 252 and 254, an outer back wall 256, an outer top wall 258, an outer bottom wall 260 and a front wall 261, all of which comprise an outer enclosure. Front wall 261 comprises a door 262 and a control panel 264 above door 262. A handle 268 is disposed on door 262 for opening the door in a pull down manner.

Combination oven 250 is configurable for operation in a convection mode and a combination impingement and convection mode.

Figure 20:
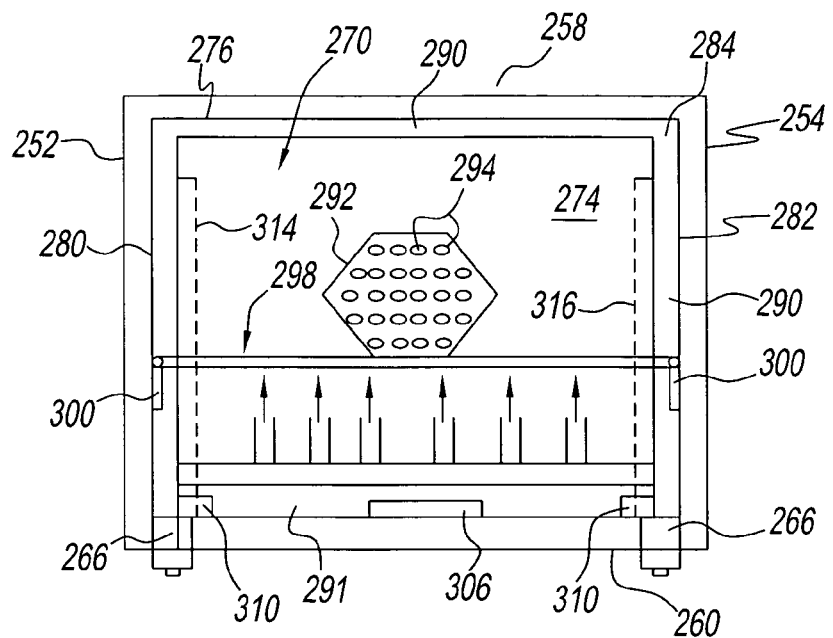
FIG. 20 is a view along line 20 of FIG. 21.
Figure 21:
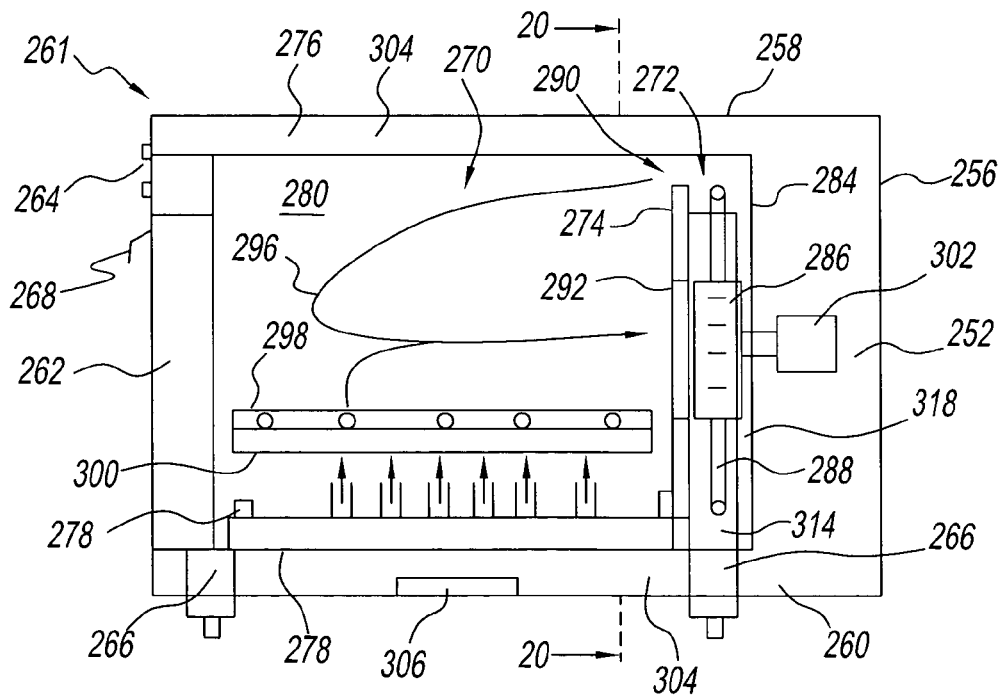
FIG. 21 is a cross-sectional view along line 21 of FIG. 18.

Referring to FIGS. 20 and 21, oven 250 comprises an oven chamber 270 and a fan box 272 supported by a support structure 266. Oven chamber 270 and fan box 272 share an inner top wall 276, an inner bottom wall 278 and inner side walls 280 and 282. Oven chamber 270 and fan box 272 also share a vertically disposed baffle plate 274. Thus, oven chamber 270 comprises door 262, baffle plate 274, inner top wall 276, inner bottom wall 278 and inner side walls 280 and 282. Fan box 272 comprises baffle plate 274, inner top wall 276, inner bottom wall 278, inner side walls 280 and 282 and an inner back wall 284. Support structure 266 is mechanically connected to outer bottom wall 260, outer side walls 252 and 254 and inner bottom wall 278.

A fan 286 is disposed in fan box 272 and a heater 288 is disposed downstream of fan 286. Fan 286 may be any fan suitable for circulating heated air in an oven. Heater 288 may be any heater (gas or electric) suitable for heating circulating air in a convection and/or impingement air oven. Preferably, heater 288 is an electrical heater having one or more heating elements disposed above and below the blades of fan 286.

Figure 19:
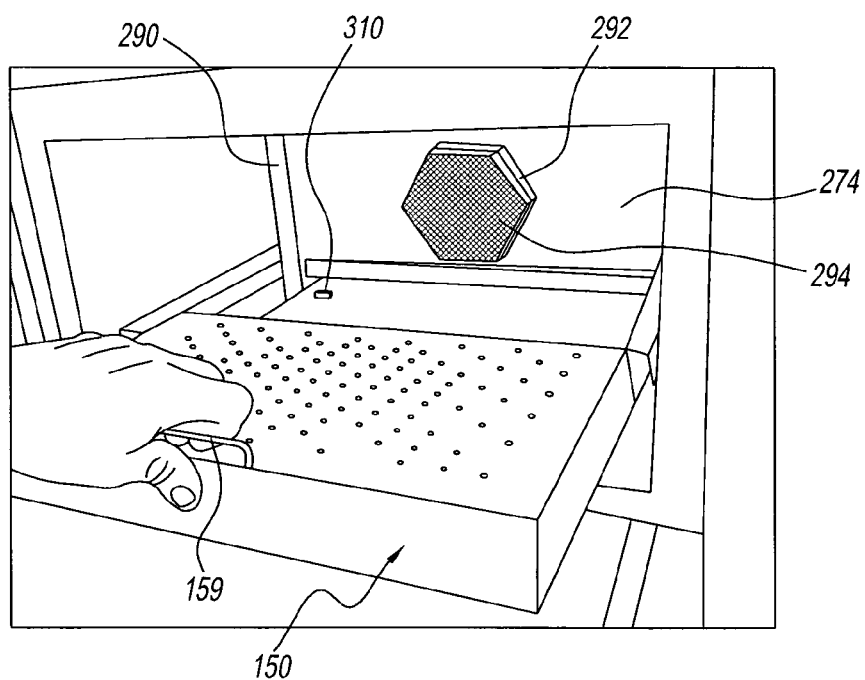
FIG. 19 depicts a portion of the oven of FIG. 18 with the door open.

Referring to FIGS. 19 and 20, baffle plate 274 comprises a plurality of openings to provide a path for air to circulate between oven chamber 270 and fan box 272. In particular, baffle plate 274 is mounted offset by an opening or gap 290 from inner side walls 280 and 282 and inner top wall 276. Baffle plate 274 is also offset from inner bottom wall 278 by a gap 291. Baffle plate 274 also includes an intake port 292 located centrally and in registration with at least a portion of the blades of fan 286. Intake port 292 comprises a plurality of apertures 294. Fan 286 circulates air heated by heater 288 through gap 290 into oven chamber 270 and takes in the circulating air via intake port 292 as shown by arrow 296 in FIG. 21.

Although not shown in FIGS. 19-21, a grease filter and/or a catalyst may be located upstream to the suction side of fan 286 (e.g., at intake port 292) to filter grease particles and other contaminates from the circulating air stream.

Referring to FIGS. 19-21, an oven rack 298 is disposed in oven chamber 270 on supports 300 mounted to inner side walls 280 and 282 so that oven rack 108 is near the bottom of intake port 292. Oven rack 298 may be a standard food rack, i.e., available off-shelf.

Outer walls 32, 34, 36, 38 and 40, which comprise an outer enclosure, inner walls 76, 78, 80, 82 and 84, which comprise an inner enclosure, and baffle plate 74 are preferably a metal, such as stainless steel.

A fan motor 302 is disposed in the space between inner back wall and outer back wall is coupled to rotate fan 286. A suitable thermal insulation (not shown) is disposed in passageway 120 about oven chamber 70 and fan box 72.

Inner walls 276, 278, 280, 282 and 284 are separated from outer walls 252, 254, 256, 258 and 260 by a passageway 304 for cooling air in oven 250. A cooling fan 306 is disposed in passageway 304 below oven chamber 270 and between outer bottom wall 260 and inner bottom wall 278. A fan motor 302 and other components are disposed in passageway 304. A fan motor (not shown) is disposed in fan motor compartment 124 and is coupled to rotate fan 286. A suitable thermal insulation (not shown) is disposed in passageway 304 about oven chamber 270 and fan box 272.

Cooling fan 306 is operable to circulate cooling air in passageway 304. The cooling air is drawn into passageway 304 from ambient via suitably located air intake ports (not shown) and flows through passageway 304 and exits via suitably located exit ports (not shown) to cool various control parts, fan motor 302 and other control parts. For example, the intake ports could be located along outer side walls near outer bottom wall and the output ports in outer back wall 256 as in oven 30 of FIG. 1.

For convection operation of oven 250, fan 286 circulates air drawn from oven chamber 270 into fan box 272 via intake port 292. The air is heated by heater 288 and circulated to oven chamber 270 via gaps 290 and 291 Referring to FIGS. 19-21, oven 250 is also configurable in an impingement mode by installing a removable lower impingement plate, which is substantially identical to and bears the same reference numeral as lower impingement plate 150 of oven 30. Lower impingement plate 150 is dimensioned for installation by sliding motion along inner bottom wall 278. Handle 158 facilitates installation and removal. A pair of stops 310 (FIGS. 19 and 20) is disposed on inner bottom wall 278 at a location to engage the sides of impingement plate 150 when it reaches the fully installed position. Also, a flange 312 is located along the bottom edge of baffle plate 274 to facilitate a flush installation of impingement plate 150 and baffle plate 274 to minimize air leakage. In an alternate embodiment, stops 310 can be replaced with any suitable guide or stop. For example, flange 312 can be suitably shaped to engage the top of lower impingement plate 150 at one or more locations to provide a flush fit.

When installed, impingement plate 150 forms with inner bottom wall 278 an impingement plenum that is in fluid communication with fan box 272 via gap 291 below baffle plate 274. Thus, airflow from fan box 272 through gap 291 pressurizes lower impingement plate 150 to provide jets or columns impingement of impingement air toward the underside of a food product located on oven rack 298, as indicated by the vertical upwardly extending arrows in FIGS. 20 and 21.

The back side of lower impingement plate 150 has an opening (not shown) to accept air from the gap between the fan cover and the bottom wall of the oven. For example, the opening can encompass all (back side totally open) or a portion of the back side of impingement plate 150. In the illustrated embodiment the box is shaped so as to slide beneath the bottom edge of baffle plate 274 during installation and removal. Flange 312 assists in the sliding motion. Flange 312 and lower impingement plate 150 are dimensioned for the sliding motion and for a relative tight fit to effectively deliver the airflow to the impingement plate with an adequate air pressure to produce the impingement columns with minimal air leakage at the back of lower impingement plate 150.

Referring to FIGS. 20 and 21, a pair of vertical baffle structures 314 and 316 is mounted on opposite sides of fan 286 in fan box 272. When installed, baffle plate 274 is mounted to vertical baffle structures 314 and 316. Vertical baffle structures 314 and 316 also serve as baffles or guides to direct more of the airflow around the top and bottom edges and a lesser airflow about the sides of baffle plate 174. To this end, the vertical structures are spaced a slight distance 318 from inner back wall 284 to provide a pair of vertical slots 318, which are narrow compared to the distance (gap 290) between the top of baffle plate 274 and inner top wall 276 and to the distance (gap 291) between the bottom of baffle plate 274 and inner bottom wall 278. Vertical baffle structures 314 and 316 do not extend above the top of baffle plate 274 so as to permit the top airflow to extend from inner side wall 280 to inner side wall 282 of oven 250. On the other hand, vertical baffle structures 314 and 316 extend below baffle plate 274 to inner bottom wall 278, i.e., the bottom of impingement plate 150. This assures an even higher airflow into impingement plate 150 and limited side airflow at the bottom to narrow vertical slots 318, thereby assuring a maximal airflow to impingement plate 150. That is, vertical baffle structures 314 and 316 baffle the airflow through the narrow slots 318 to be a lesser airflow than the flow through gaps 290 above and 291 below baffle plate 274. This serves to maximize the air volume and pressure in lower impingement plate 150 to deliver jets of impingement air.

Referring to FIGS. 5 and 19, the less closely spaced jet holes near the edges of impingement plate 150 provides lesser impingement air to the side s of a food product on the oven rack. However, in oven 250 convection air also flows around the edges of baffle plate 274 and off inner side walls 280 and 282 of oven chamber 270. This helps with browning of the bottom of the food product portions that are near inner side walls 280 and 282.

Oven 250 can alternatively be provided with a removable upper impingement plate (not shown) similar to upper impingement plate 152 of oven 30 to provide impingement air from above either in place of or in addition to lower impingement plate 150.

A microwave facility (not shown) may be disposed adjacent one of the oven walls, e.g., the top wall, and can also be used in a microwave mode or in combination with the heated air stream in either an impingement mode or a non-impingement mode.

Figure 22:
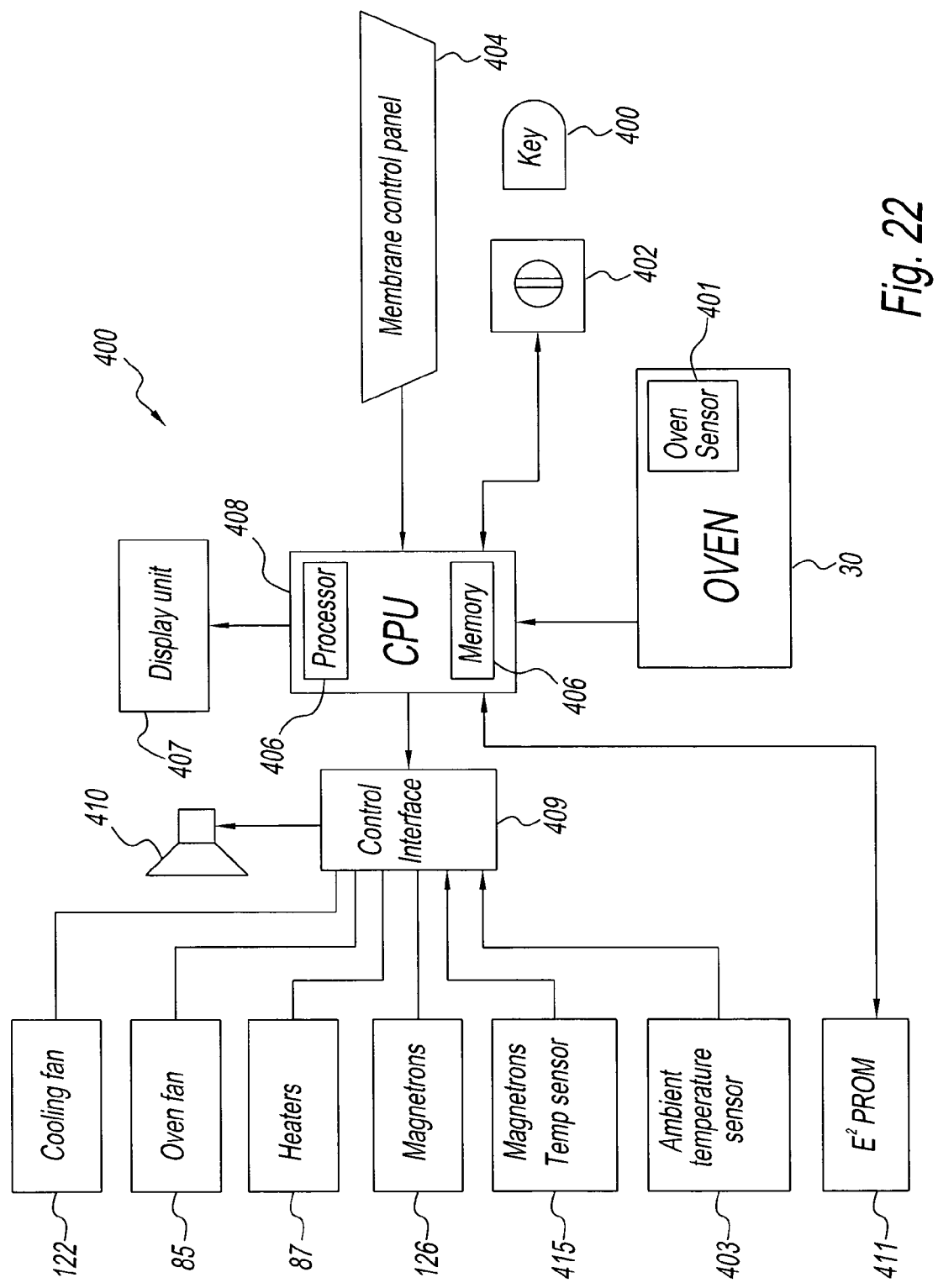
FIG. 22 is a block diagram of the controller of the oven of FIG. 1.

Referring to FIG. 22, a controller 400 is shown for oven 30. Controller 400 is similar to the controller shown in U.S. Pat. Nos. 6,660,982 and 6,903,318, which are hereby incorporated by reference. In particular, controller 400 includes a central processing unit (CPU) 408 that is interconnected with a key reader 402, a manual control panel 404, a display unit 407, an audio alarm/beeper 410, a control interface 409, a memory 411 and oven 30. CPU 408 comprises a processor 405 and a memory 406.

Oven 30 comprises an oven temperature sensor 401 that is located in oven chamber 70. Oven temperature sensor 401 provides a signal that is proportional to the temperature of oven chamber 70. This signal is coupled to CPU 408.

Key reader 402 is operable to read information carried on a key. This information may include program data corresponding to different cooking sequences at a data site, and is then sent to the cooking site for use with oven 30 and optionally with other ovens.

Control interface 409 is interconnected with a number of devices of oven 30. To this end, control interface 409 is interconnected with cooling fan 122, oven fan 85, heaters 87, magnetrons 126, a magnetron temperature sensor 415, an ambient temperature sensor 403 and a memory 411.

A plurality of control programs is stored in memory 411 and/or key 400.

Figure 23:
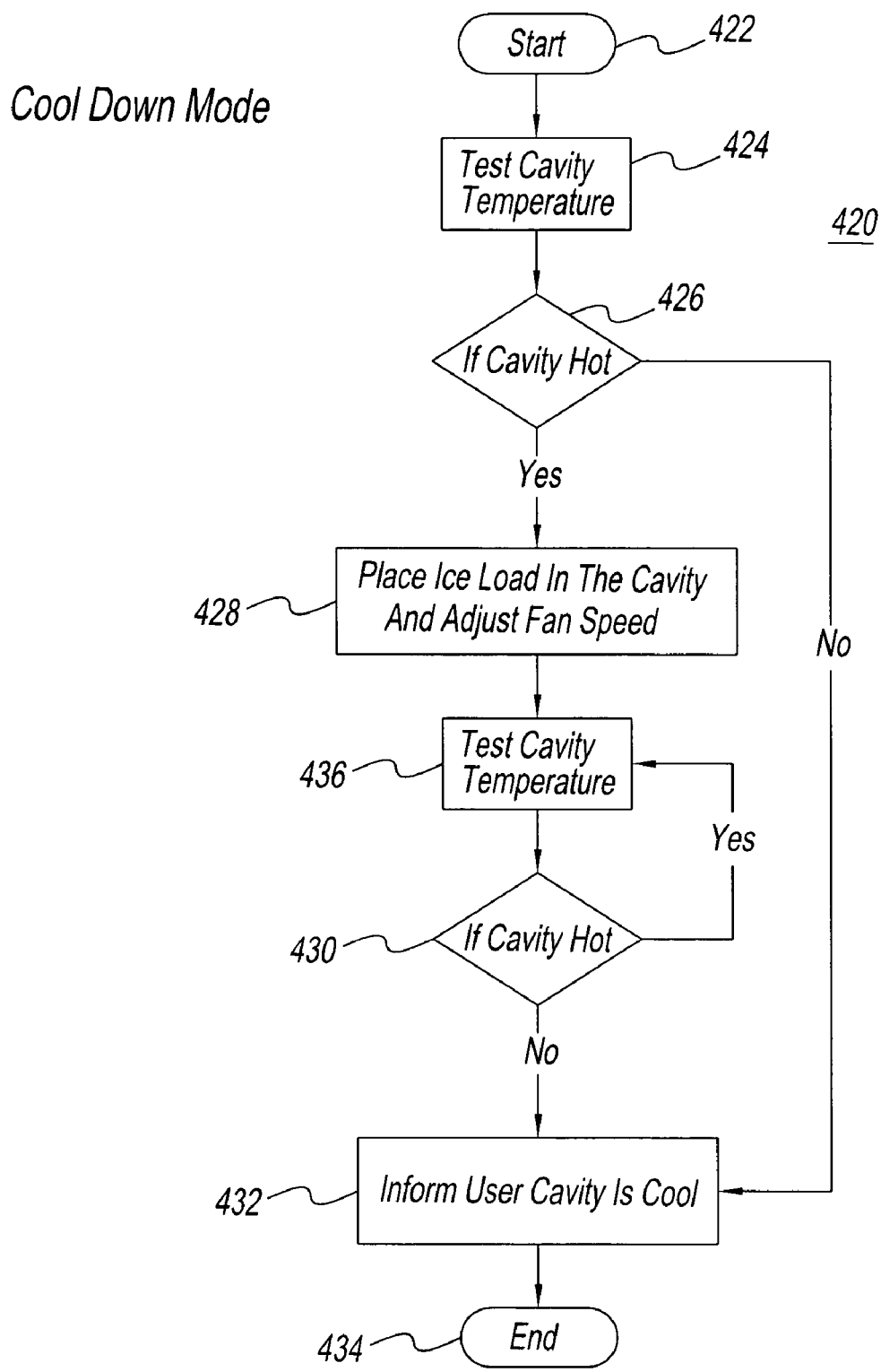
FIGS. 23-28 are flow diagrams of program mode features of the controller of FIG. 22.

Referring to FIG. 23, a cool down program or mode 420 is used by CPU to control a cool down of oven 30. Cool down program begins at start box 422 and proceeds to step 424, which tests or samples a current temperature of oven chamber 70 provided by oven temperature sensor 401. Step 426 determines if the cavity (oven chamber 70) is too hot. For example, step 426 determines if the current oven temperature greater than a predetermined temperature limit. If not, the user is informed on display unit 407 that the oven chamber is cool. If step 426 determines that the current oven temperature is too hot, the user is instructed to place a load of ice in oven chamber 70. Step 436 then automatically adjusts the speed of fan 85 and/or cooling fan 122. Step 428 then tests the temperature of oven chamber 70 based on the temperature signal provided by oven temperature sensor 401. Step 430 determines if the cavity is hot. For example, step 430 determines if the oven chamber temperature above a safe limit at or below which it is safe for an operator to clean or service oven 30. If yes, cool down mode reiterates in the loop of steps 428 and 430 until step 430 determines that the oven chamber temperature has dropped to or below the safe limit. When this happens, step 432 informs the user that the oven is cool with a message on display unit 407. Cool down program 400 ends at step 458.

Figure 24:
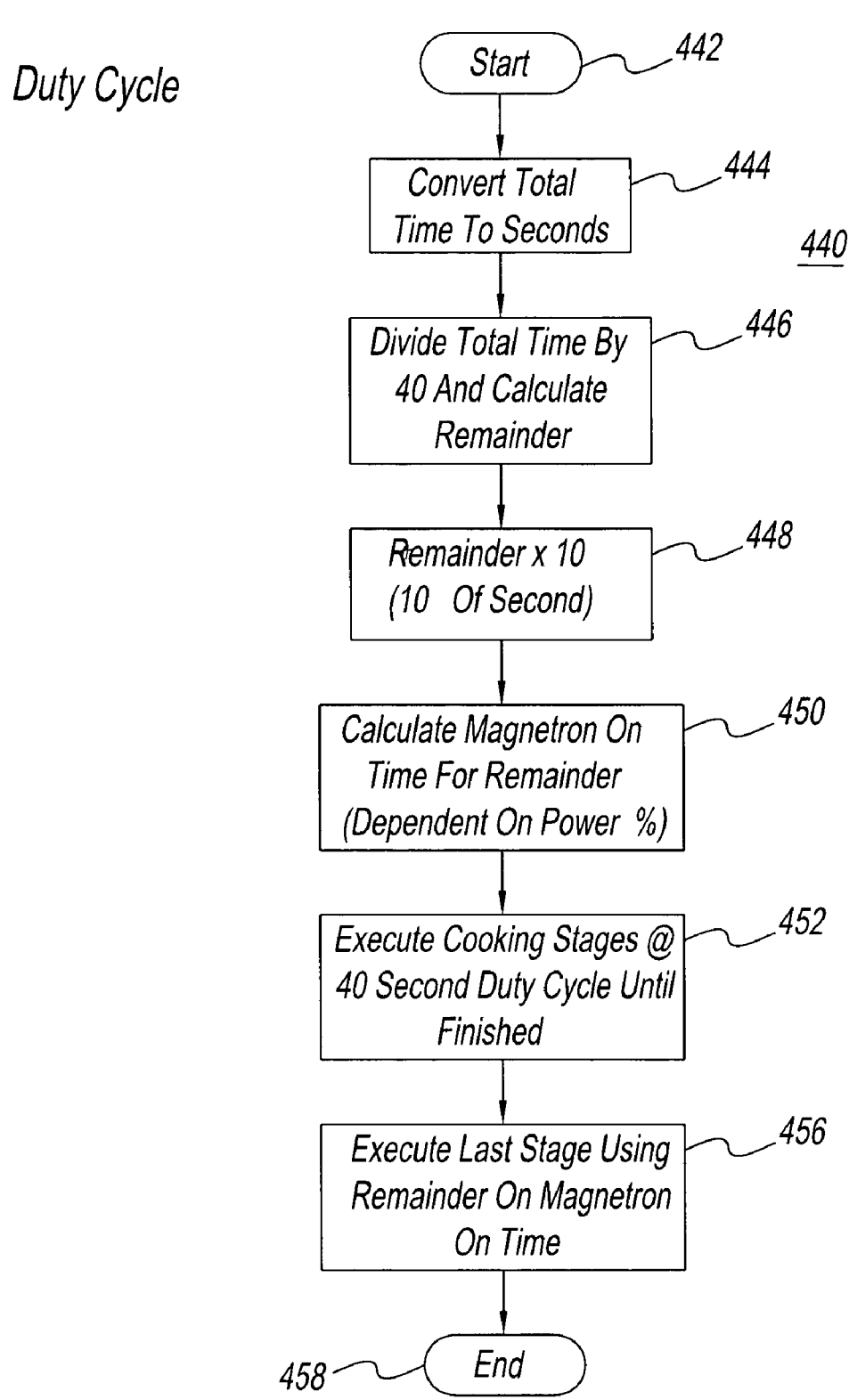

Referring to FIG. 24, a duty cycle control mode 440 is used by CPU to control the duty cycle of the magnetrons. Duty cycle program 440 begins at start box 442 and proceeds to step 444, which converts total microwave cook time to seconds. Step 446 then divides the total time by 40 and calculates a remainder. As an example, assume a total microwave cook time of 50 seconds and a duty cycle of 25%. Step 446 calculates one interval of 40 seconds and a remainder of 10 seconds. Step 448 converts the remainder of ten seconds into tenths of a second by multiplying by 10 for a total of 100 tenths of a second. Step 450 then calculates the on time of magnetrons 126 for the 25% duty cycle of the 40 second interval and the ten second remainder. The result is for the 40 second interval: 10 seconds on and 30 seconds off and for the remainder; 2.5 seconds (250 tenths of a second) on and 7.5 seconds (750 tenths of a second) off. Step 452 executes the cooking stages at 40 second intervals, which for the assumed example is one 40 second interval. Step 456 then executes a last stage using the remainder on time for magnetrons 126. Duty cycle control mode 440 ends at step 458.

Figure 25:
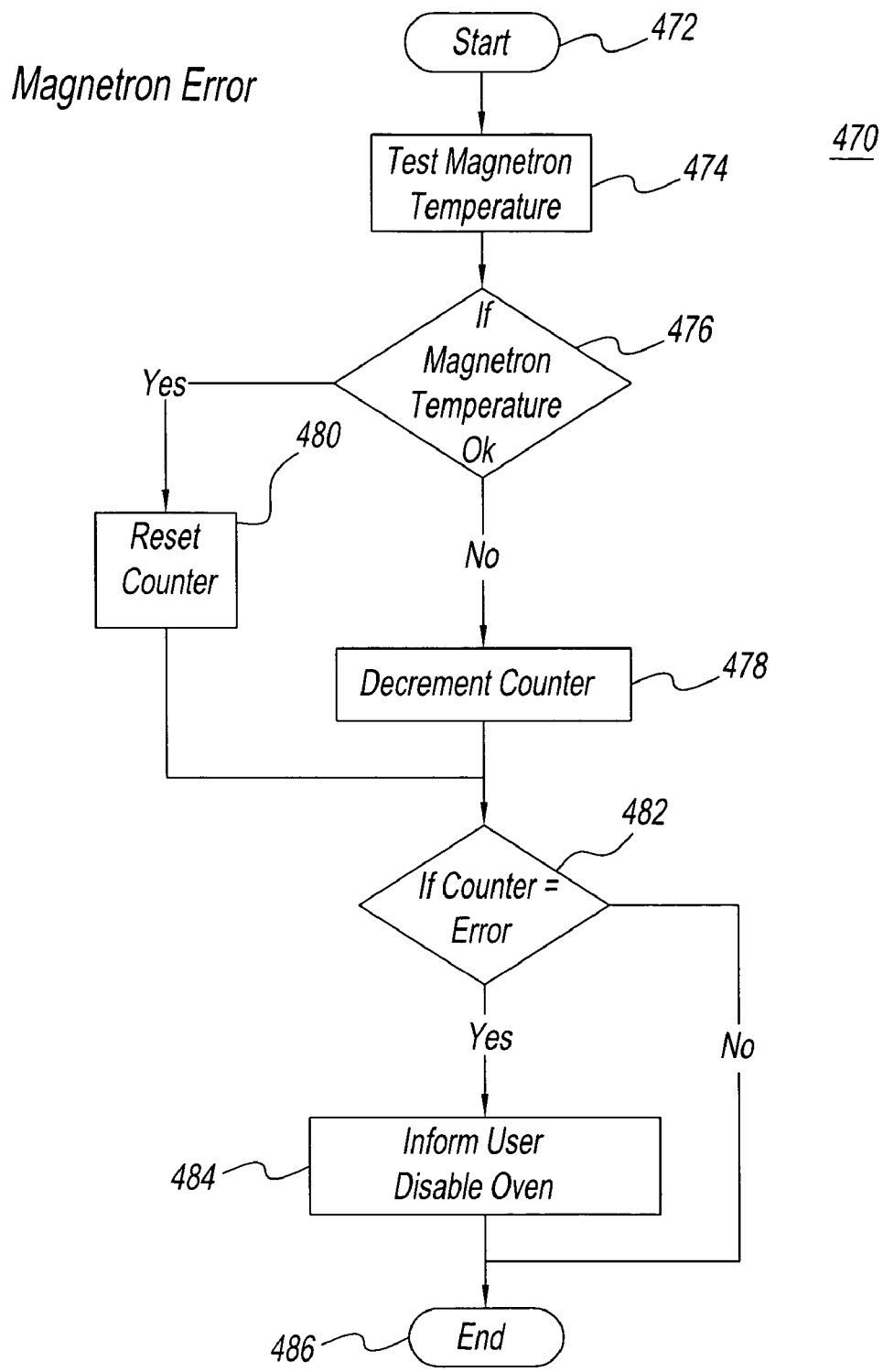

Referring to FIG. 25, a magnetron error program 470 is used by CPU 408 to handle magnetron errors. Magnetron error program 470 begins at start box 472 and proceeds to step 474, which tests the temperature of magnetrons 126. Step 474 samples the temperature signal provided by magnetron sensor 415 to provide a current magnetron temperature. Step 476 then determines if the magnetron current temperature is okay. For example, the current temperature is okay if it is in a range having a predetermined upper limit of too hot (magnetron overheated) and a lower limit of too cold (magnetron shutdown or other failure). Step 480 then resets a counter. Step 482 determines if the counter value is an error. Since step 480 reset the counter there is no error and magnetron error program 470 would then end at step 486. If step 476 determines that the current magnetron temperature is outside the range, step 478 decrements the counter. Step 482 would the determine that the counter value is an error and step 484 displays a message on display unit 407 informing the user to disable the oven.

Figure 26:
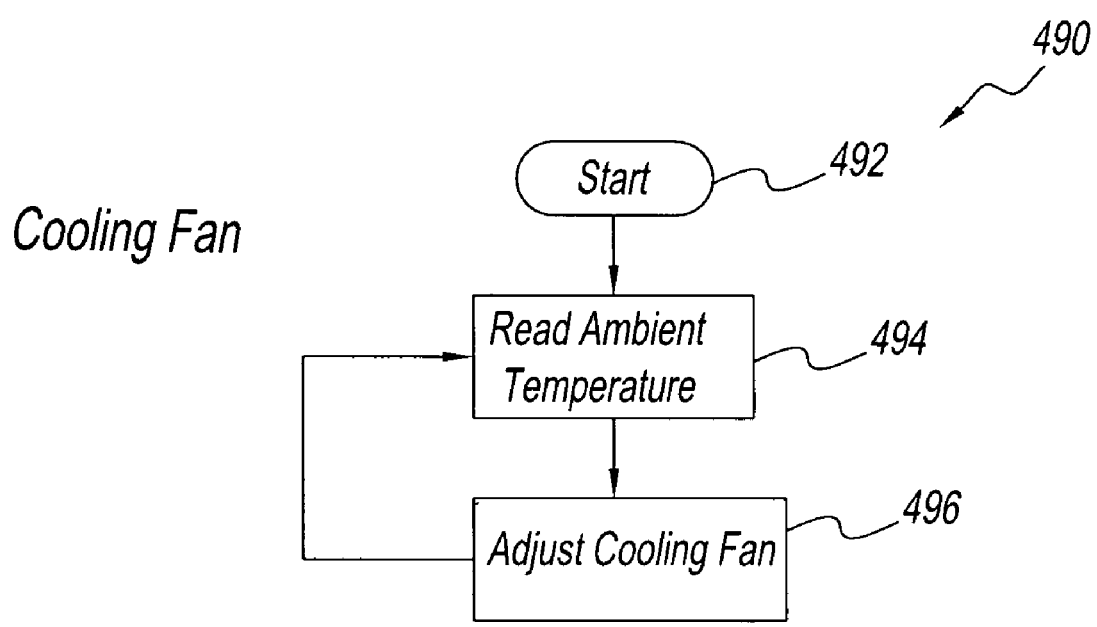

Referring to FIG. 26, a cooling fan control program 490 begins at start 492 and proceeds to step 494, which reads the current ambient temperature from ambient temperature sensor 415. Based on the current ambient temperature, controller 400 adjusts the speed of cooling fan 122. For example, the cooling fan speed is adjusted higher for warmer ambient temperatures and lower for cooler ambient temperatures.

Figure 27:
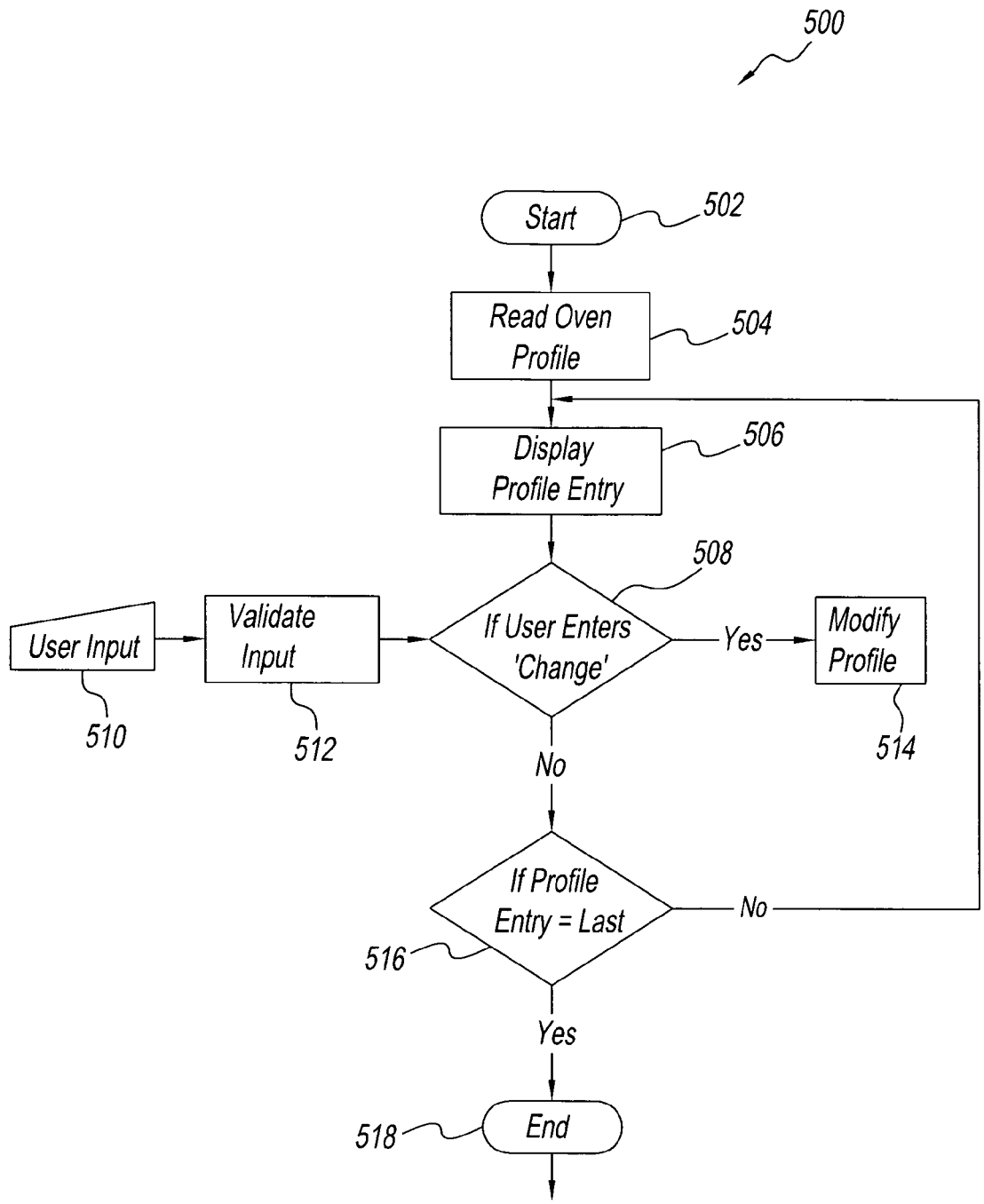

Referring to FIG. 27, a profile program 500 begins at start 502 and proceeds to step 504, which reads a default oven profile. Step 506 displays the default oven profile on display unit 407. For example, the oven profile includes a plurality of parameters affecting the user interface, such as language to be used, temperature units ° F. or ° C., manual or program mode, beeper volume or sound and others. The user at step 510 can input changes to the profile parameters. Step 512 validates the entered changes. Step 508 determines if the user has entered any change. If yes, step 514 modifies the profile and step 506 displays the change. The user chan then edit the change or make other changes. If other changes are made, profile program 500 iterates in the loop of steps 506, 508 and 514 until step 508 determines that the user has not entered a change. Step 516 then determines if the profile entry is the last profile parameter. If not, profile program 500 returns to iterate in the loop of steps 506, 508, 514 and 516 until step 516 determines that the current profile entry is the last profile entry. Step 506 displays the next profile parameter and steps 508 and 514. Profile program then ends at step 518.

Figure 28:
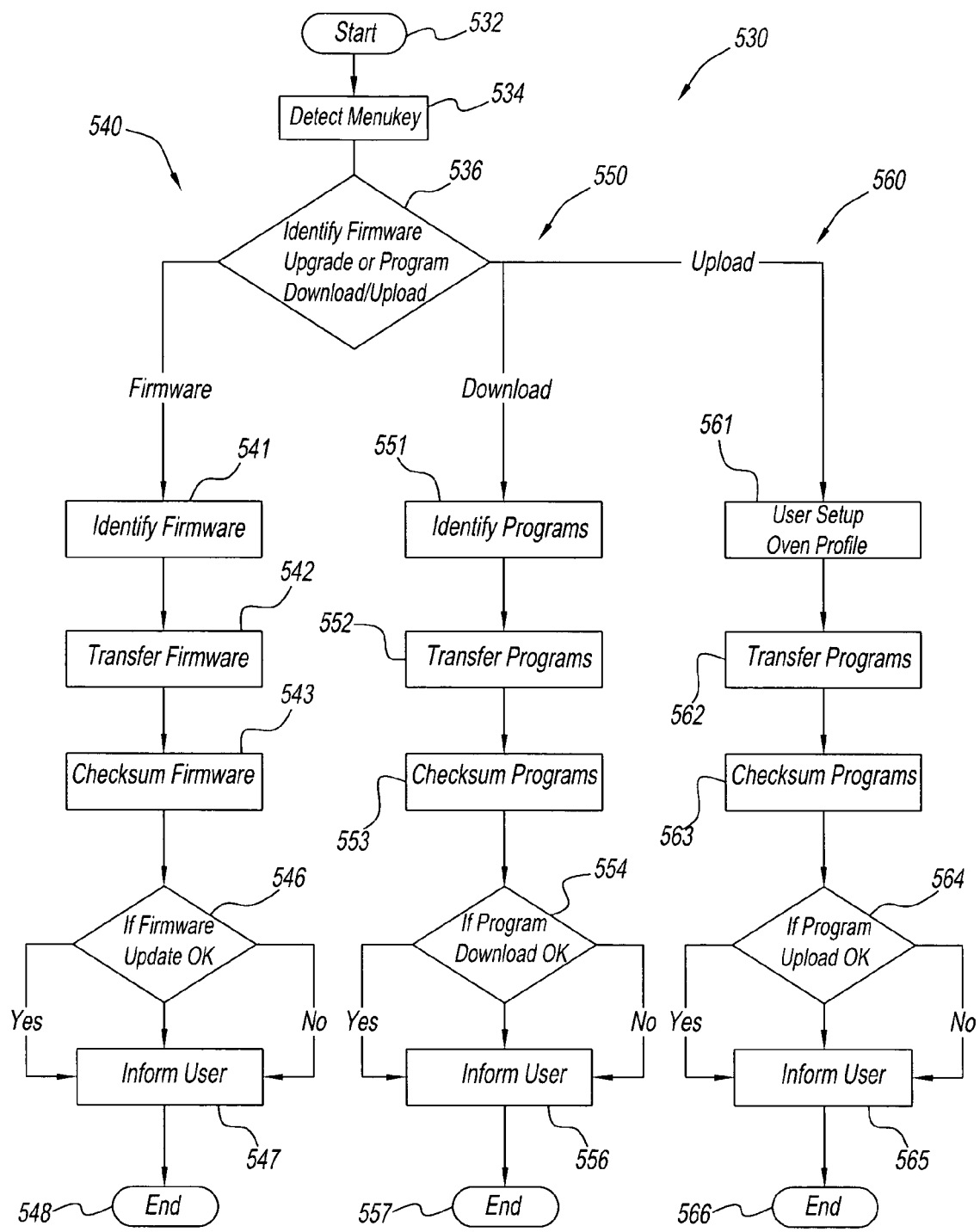

Referring to FIG. 28, a down and upload program 530 controls data and program downloads and uploads between controller 400 and menu key 400. Download and upload program 530 begins at start 532 and proceeds to step 534, which detects a menu key 400 at key reader 402. Step 536 identifies whether menu key 400 is inserted for a firmware upload, a program download or a program upload.

If step 536 identifies a firmware upgrade, down and upload program 530 enters a firmware upload routine 540. Firmware upgrade routine 540 begins at step 541, which identifies the firmware. Step 542 transfers the firmware to CPU memory 406. Step 543 performs a checksum of the firmware data. Step 546 determines if the firmware update is okay. If yes, step 547 displays a message on display unit 407 that the upgrade is okay. If no, step 547 displays a message on display unit 407 that the upgrade is not okay. Firmware upgrade routine 540 then ends at step 548.

If step 536 identifies a program download, down and upload program 530 enters a program download routine 550. Program download routine 550 begins at step 551, which identifies the programs to be downloaded. Step 552 transfers the programs to memory 411. Step 553 performs a checksum of the program data. Step 554 determines if the program download is okay. If yes, step 556 displays a message on display unit 407 that the program download is okay. If no, step 556 displays a message on display unit 407 that the program download is not okay. Program download routine 550 then ends at step 557.

If step 536 identifies a program upload, down and upload program 530 enters a program upload routine 560. Program upload routine 560 begins at step 561, which identifies the programs to be downloaded. Step 562 transfers the programs to memory 411. Step 563 performs a checksum of the program data. Step 564 determines if the program upload is okay. If yes, step 565 displays a message on display unit 407 that the program upload is okay. If no, step 565 displays a message on display unit 407 that the program upload is not okay. Program upload routine 550 then ends at step 566.

The present invention having been thus described with particular reference to the preferred forms thereof, it will be obvious that various changes and modifications may be made therein without departing from the spirit and scope of the present invention as defined in the appended claims.

What is claimed is:

1. A method of operating an oven that includes an oven chamber that comprises a plurality of walls, one of said walls being vertical and comprising a baffle plate, said method comprising:

circulating heated air between a fan box and said oven chamber via said baffle plate;

converting with a removable impingement plate at least a portion of said circulating air to (a) an impingement mode, where columns of impingement air flow substantially in a vertical direction within said oven chamber toward a food product when said removable impingement plate is disposed within said oven chamber, and (b) a convection mode when said removable impingement plate is removed from said oven chamber;

providing microwave energy into said oven chamber via at least one wall of said plurality of walls of said oven chamber; and controlling said oven in at least one mode selected from the group consisting of: a microwave mode, said convection mode, said impingement mode, a combination microwave and impingement mode, and a combination microwave and convection mode.

2. The method of claim 1, wherein said wall by way of which said microwave energy is provided is vertical.

3. The method of claim 1, wherein said wall by way of which said microwave energy is provided is a back wall or a side wall.

4. The method of claim 1, wherein said microwave energy is provided by a microwave generator via two walls of said plurality of walls of said oven chamber.

5. The method of claim 1, further comprising installing in and removing from said oven chamber said removable impingement plate.

6. The method of claim 1, wherein said removable impingement plate is installable in and removable from said oven chamber with a sliding motion.

7. The method of claim 1, wherein said wall by way of which said microwave energy is provided is a side wall and further comprising running a fan disposed in the fan box to provide said circulating heated air between the fan box and said oven chamber via the baffle plate.

8. The method of claim 1, wherein said removable impingement plate is disposed near a bottom wall of said plurality of walls of said oven chamber so that said impingement air flows upwardly.

9. The method of claim 8, wherein an additional impingement plate is disposed near a top wall of said plurality of walls of said oven chamber so that another portion of said circulating air is converted to impingement air that flows downwardly.

10. The method of claim 9, wherein said microwave energy is also provided into said oven chamber via an opposite side wall of said plurality of walls of said oven chamber.

11. The method of claim 1, wherein said removable impingement plate is disposed near a top wall of said plurality of walls of said oven chamber so that said impingement air flows downwardly.

12. The method of claim 1, wherein said microwave energy is also provided into said oven chamber via an opposite side wall of said plurality of walls of said oven chamber.

13. The method of claim 1, wherein said removable impingement plate comprises a frame that includes a front and opposed sides separated by a wall that contains an array of jet holes shaped to provide said impingement air.

14. The method of claim 1, wherein said removable impingement plate further comprises a handle to facilitate installation and removal by a sliding motion.

15. The method of claim 1, wherein said removable impingement plate is installed substantially flush with said baffle plate to receive circulating air from said fan box, and wherein said removable impingement plate comprises a diverter to provide a substantially uniform pressure to said jet holes, whether located near or remote from said baffle plate.

16. The method of claim 1, wherein an oven rack is disposed in said oven chamber, wherein said baffle plate comprises at least one first opening located below said oven rack, at least one second opening located above said oven rack and near a top of said baffle plate, and one or more third openings located below said first openings, and wherein said circulating air flows from said fan box to said oven chamber via said second and third openings and returns to said fan box via said first opening.

* * * * *